(12) United States Patent
Ritz et al.

(10) Patent No.: US 7,178,562 B2
(45) Date of Patent: Feb. 20, 2007

(54) PELLET TRANSFER APPARATUS AND METHOD

(75) Inventors: Gregory A. Ritz, Berkey, OH (US); Thomas C. Truman, Sylvania, OH (US)

(73) Assignee: Graham Packaging PET Technologies Inc., York, PA (US)

( * ) Notice: Subject to any disclaimer, the term of this patent is extended or adjusted under 35 U.S.C. 154(b) by 252 days.

(21) Appl. No.: 10/822,297

(22) Filed: Apr. 8, 2004

(65) Prior Publication Data

US 2005/0241721 A1 Nov. 3, 2005

(51) Int. Cl.
*B65B 1/04* (2006.01)

(52) U.S. Cl. .............................. 141/2; 141/82; 141/145; 425/297; 425/527; 264/543

(58) Field of Classification Search .................... 141/2, 141/18, 69, 71, 82, 125, 129, 144–150; 425/297, 425/311, 527; 264/540–543
See application file for complete search history.

(56) References Cited

U.S. PATENT DOCUMENTS

| | | | |
|---|---|---|---|
| 3,053,221 A | 9/1962 | Heffley et al. | |
| 3,360,827 A | 1/1968 | Aichele | |
| 3,596,315 A | 8/1971 | Yoshikawa et al. | |
| 4,277,431 A | 7/1981 | Peller | |
| 4,640,673 A | 2/1987 | Takeda et al. | |
| 5,088,915 A | 2/1992 | Korsch et al. | |
| 5,386,971 A | 2/1995 | Ingram | |
| 5,456,587 A | 10/1995 | Ingram | |
| 5,603,964 A | 2/1997 | Rote et al. | |
| 5,807,592 A | 9/1998 | Alieri | |
| 5,811,044 A | 9/1998 | Rote et al. | |
| 5,863,571 A | 1/1999 | Santais et al. | |
| 5,866,177 A | 2/1999 | Ingram | |
| 6,123,880 A | 9/2000 | Ingram | |
| 6,368,094 B1 * | 4/2002 | Dennis et al. | 425/144 |
| 6,422,854 B1 | 7/2002 | Dennis et al. | |
| 7,052,644 B2 * | 5/2006 | Larsen | 264/531 |
| 2003/0198707 A1 | 10/2003 | Battilani | |
| 2003/0198708 A1 | 10/2003 | Pucci | |

FOREIGN PATENT DOCUMENTS

| | | |
|---|---|---|
| EP | 0858878 A2 | 8/1998 |
| EP | 1293332 A2 | 3/2003 |
| EP | 1357063 A3 | 12/2003 |

OTHER PUBLICATIONS

International Search Report mailed Jul. 29, 2005 in corresponding application PCT/US2005/011832.

* cited by examiner

*Primary Examiner*—Timothy L. Maust
(74) *Attorney, Agent, or Firm*—Rissman Jobse Hendricks & Oliverio LLP

(57) ABSTRACT

An apparatus for transferring a mold charge pellet to a molding machine having a mold with a mold cavity includes a hub rotated about an axis, at least one arm extending generally radially from the hub to rotate with the hub around the axis, and a cam system extending at least partially around the axis and operably coupled to the arm for moving the arm along a predetermined path with respect to the axis as the hub and the arm rotate around the axis. In one presently preferred embodiment, at least a portion of the arm traveling along a plane that is parallel to the axis during a portion of said path.

11 Claims, 19 Drawing Sheets

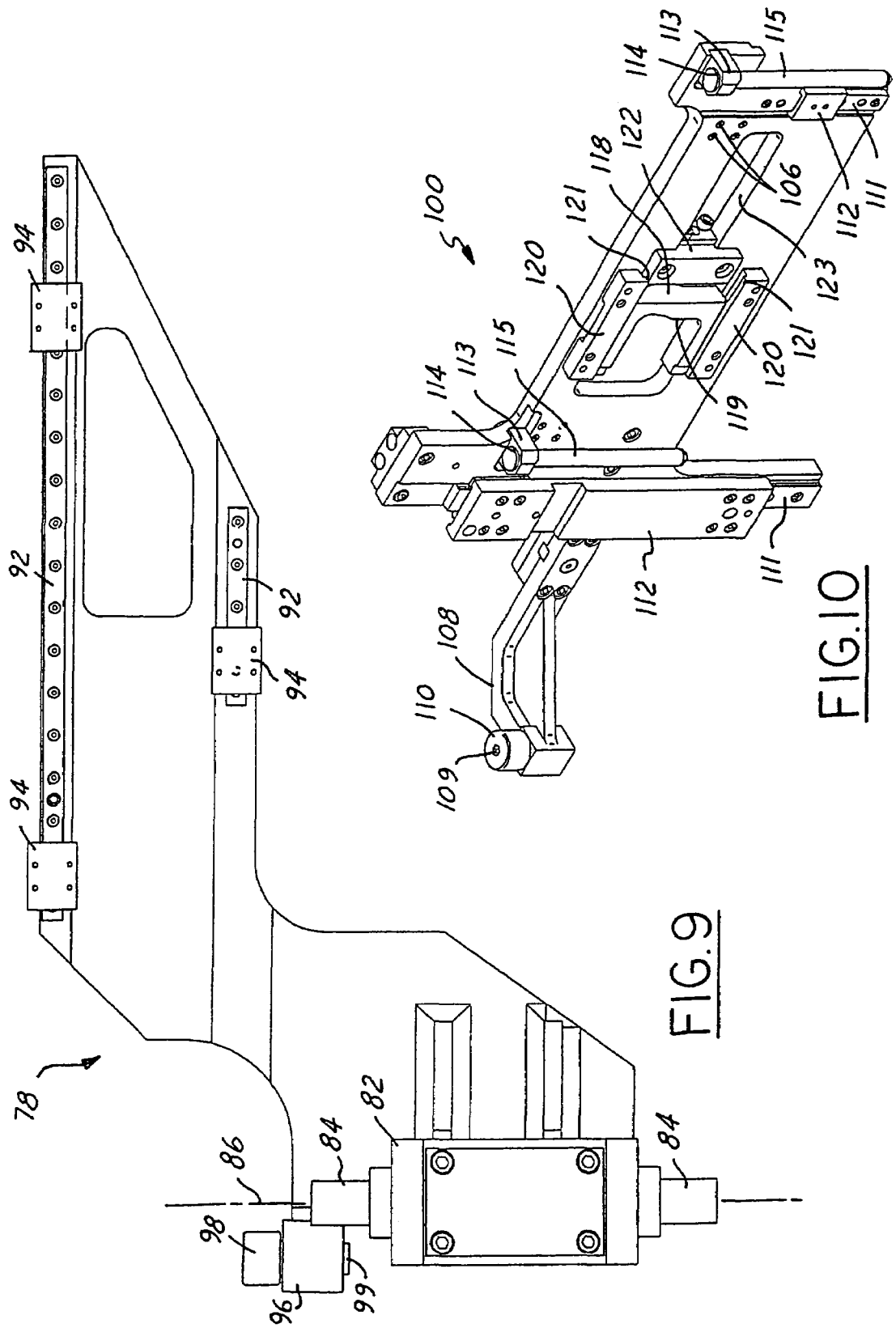

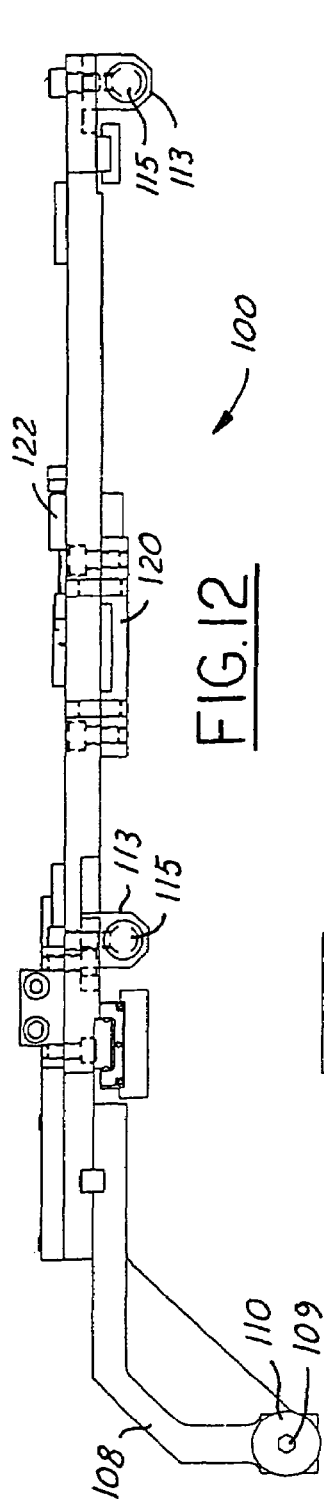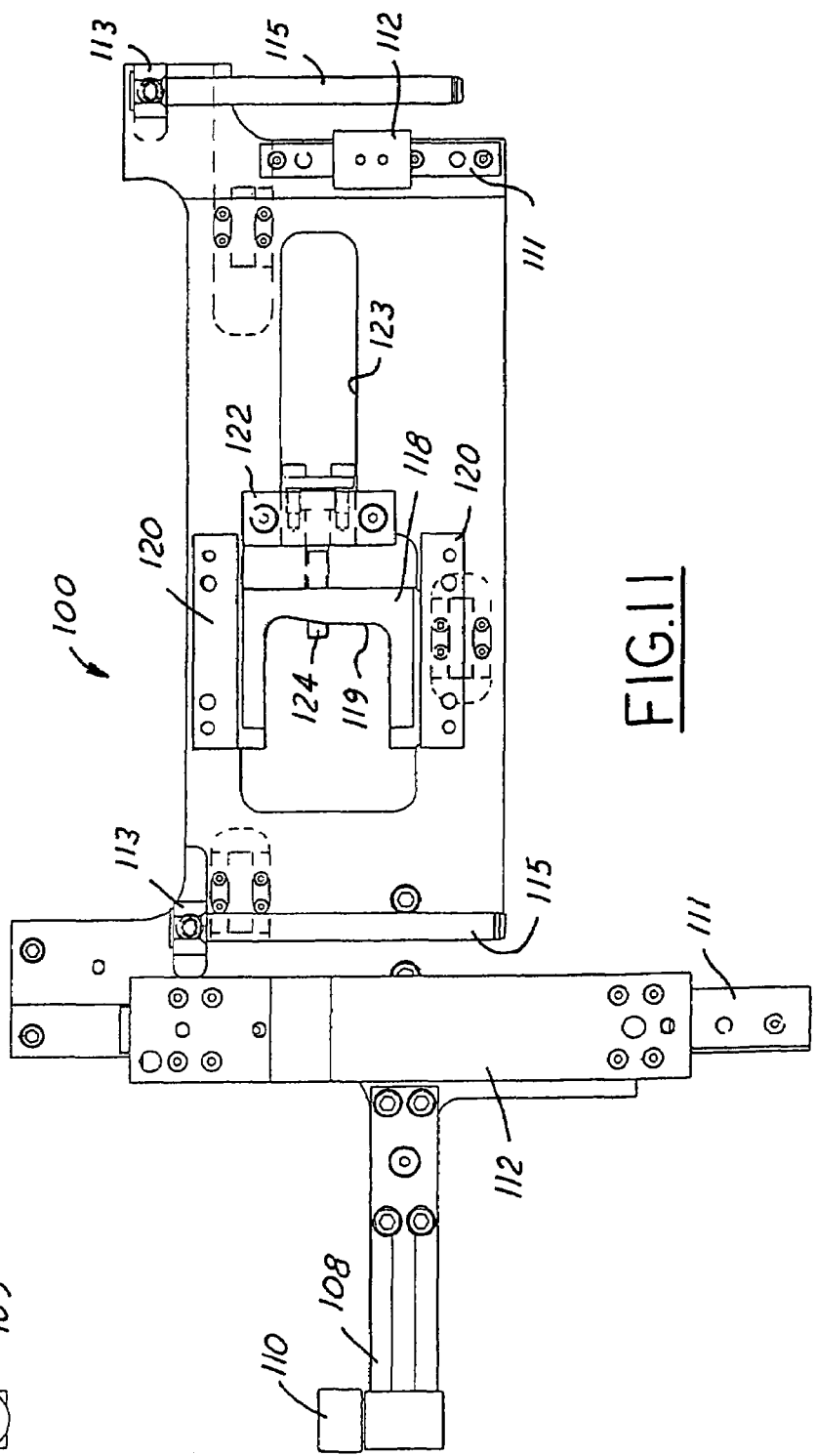

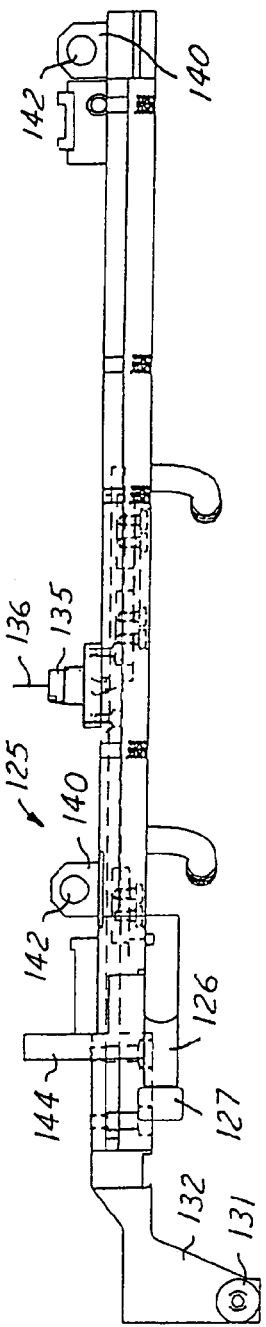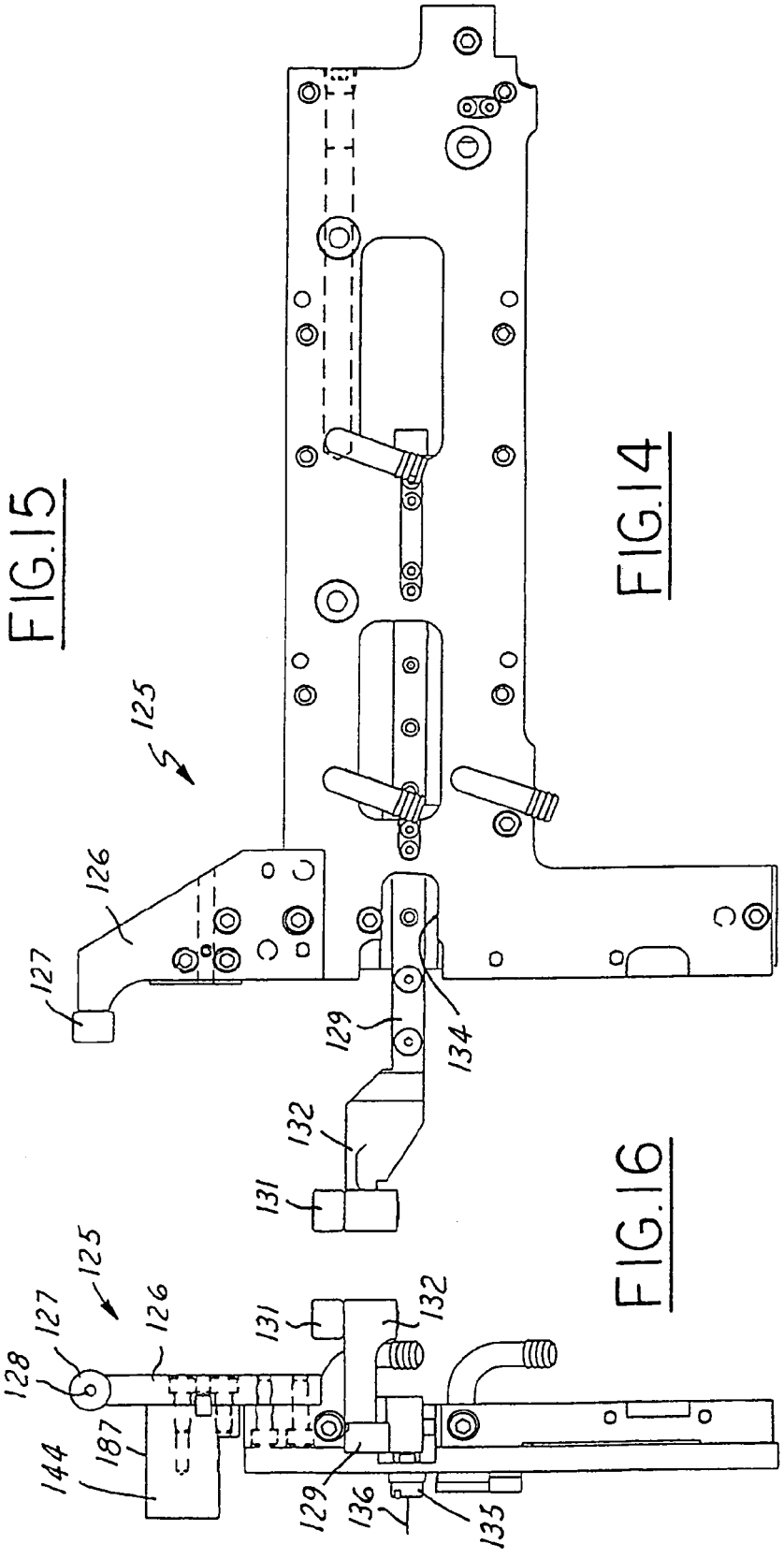
FIG.15
FIG.14
FIG.16

PELLET TRANSFER APPARATUS AND METHOD

FIELD OF THE INVENTION

This invention relates generally to molding plastic articles and more particularly to an apparatus for providing charges of plastic to a molding machine.

BACKGROUND OF THE INVENTION

Various plastic articles, such as plastic closure for containers, have been formed by a compression molding process. Some compression molding machines have a plurality of tools mounted in a circumferential array on a rotatable turret in a plurality of opposed coacting pairs. The tools of each pair carry opposed male and female mold sections that when closed together form a cavity in which plastic articles may be compression molded. During a portion of the rotation of the turret, the mold tooling pairs are moved toward each other for compression molding articles between the tooling pairs and away from each other for releasing articles molded between the tooling pairs and to receive fresh charges of plastic into the mold cavities. The charges of plastic may be taken and delivered from a stream extricate from an extruder providing a relatively rapidly available supply of plastic material for the molding machine.

SUMMARY OF THE INVENTION

An apparatus for transferring a mold charge pellet to a molding machine having a mold with a mold cavity includes a hub rotated about an axis, at least one arm extending generally radially from the hub to rotate with the hub around the axis, and a cam system extending at least partially around the axis and operably coupled to the arm for moving the arm along a predetermined path with respect to the axis as the hub and the arm rotate around the axis. In one presently preferred embodiment, at least a portion of the arm travels along a plane that is parallel to the axis during a portion of said path.

In one implementation, the molding machine includes a turret rotated about an axis that is parallel to the axis about which the hub rotates. A plurality of molds are carried by the turret for movement in an endless path with each mold preferably including at least one radially aligned pair of mold cavities. Correspondingly, each arm of the apparatus preferably includes two sets of tooling with each set adapted to deliver a separate mold charge pellet into a separate one of the mold cavities. To facilitate aligning the tooling sets with the mold cavities, the arm is preferably angularly, radially and axially pivoted relative to the hub. According to one presently preferred aspect, a point midway between the tooling sets on each arm is moved along a plane during a portion of the movement of the arm wherein the mold charge pellets are transferred to the mold cavities. The planar motion preferably includes an axially component wherein the arm is moved axially toward the mold cavities to facilitate releasing the mold charge pellets from the tooling.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 9 is a side view of a base plate of the arm;

FIG. 10 is a perspective view of a second plate of the arm;

FIG. 11 is a side view of the second plate;

FIG. 12 is a plan view of the second plate;

FIG. 14 is a side view of a third plate;

FIG. 15 is a plan view of the third plate;

FIG. 16 is an end view of the third plate;

DETAILED DESCRIPTION OF THE PREFERRED EMBODIMENTS

Figure 1:
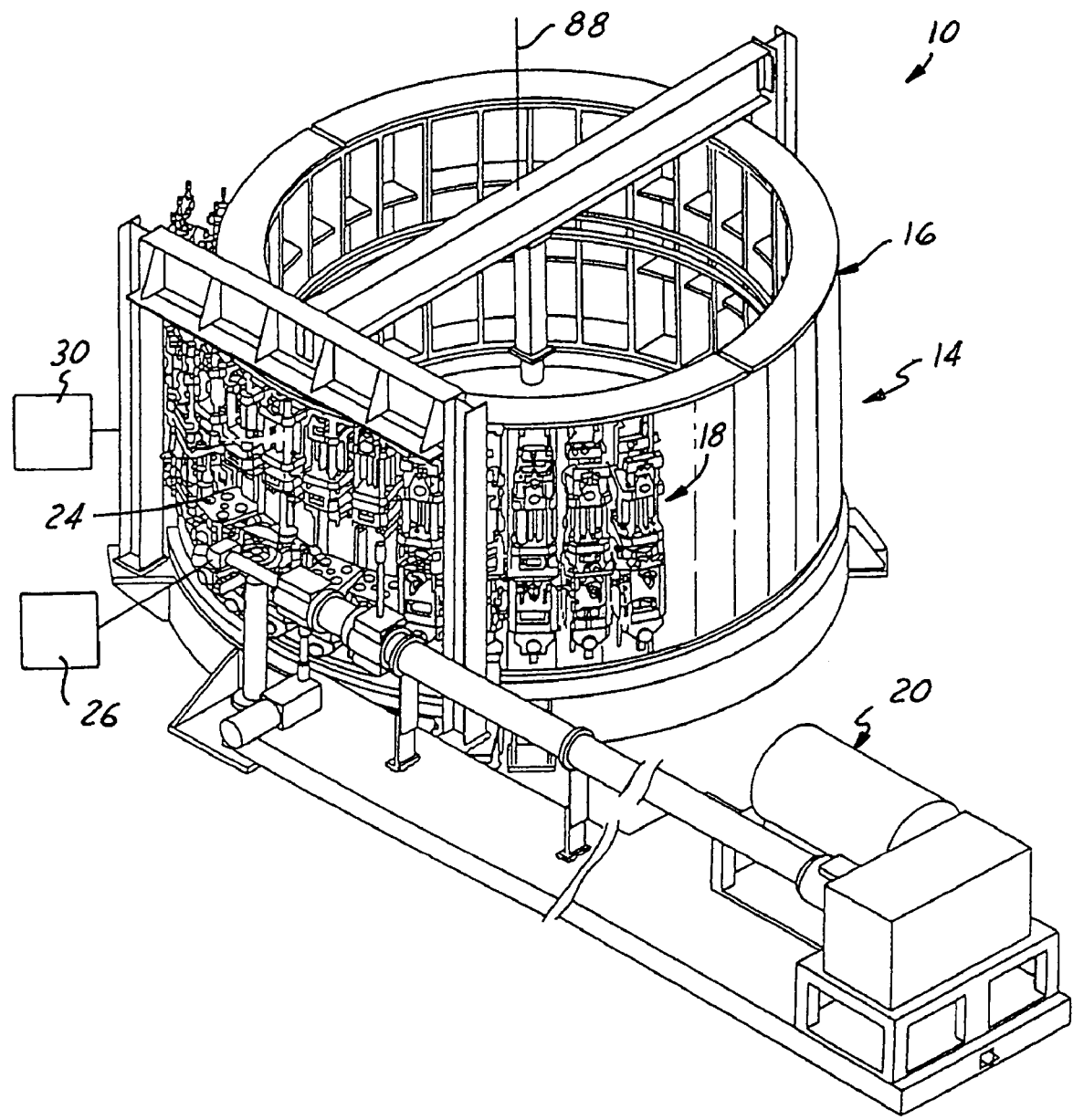
FIG. 1 is a perspective view of one presently preferred embodiment of an apparatus for compression molding plastic articles including one presently preferred embodiment of a pellet cutter and transfer apparatus.

Referring in more detail to the drawings, FIG. 1 illustrates a system 10 for compression molding plastic articles such as preforms that are subsequently molded into plastic containers. The system 10 includes a compression molding machine 14 that preferably includes a rotary turret 16 with a plurality of pairs of mold tooling 18 disposed about the periphery of the turret 16 in an endless path (in FIG. 1, some mold tooling pairs have been removed to show the turret 16). An extruder 20 provides molten plastic material that is delivered to the mold tooling pairs 18 to form the plastic articles. The extruded material is delivered to the mold cavities 24 by a pellet cutter and transfer apparatus 26 that preferably accurately cuts the extruded material 20 into desired sized mold charge pellets 28 (FIG. 35) and delivers the pellets 28 or plastic charges into cavities 24 of the mold tooling pairs 18. A take-out mechanism 30 is preferably provided to remove formed plastic articles from mold cavities 24 and to transfer them away from the compression molding apparatus 14 for further processing, such as either cooling or subsequent blow molding.

Desirably, the mold tooling pairs 18 are open during a portion of the rotary movement of the turret 16 to permit the formed plastic articles to be removed from and fresh mold pellet charges 28 to be delivered into the mold cavities 24. To increase the productivity and efficiency of the system 10, the mold tooling pairs 18 are preferably separated for a limited duration of the molding cycle. This increases the time during the cycle for compression molding and permits an increased rotary speed of the compression molding apparatus 14. Accordingly, in one presently preferred embodiment, the pellet cutter 26 is constructed and arranged to be disposed generally beneath at least a portion of the take-out apparatus 30 so that as the take-out apparatus 30 is removing plastic articles from the tooling pairs 18, the pellet cutter and transfer apparatus 26 is delivering fresh plastic charges 28 into the mold cavities 24.

Figure 2:
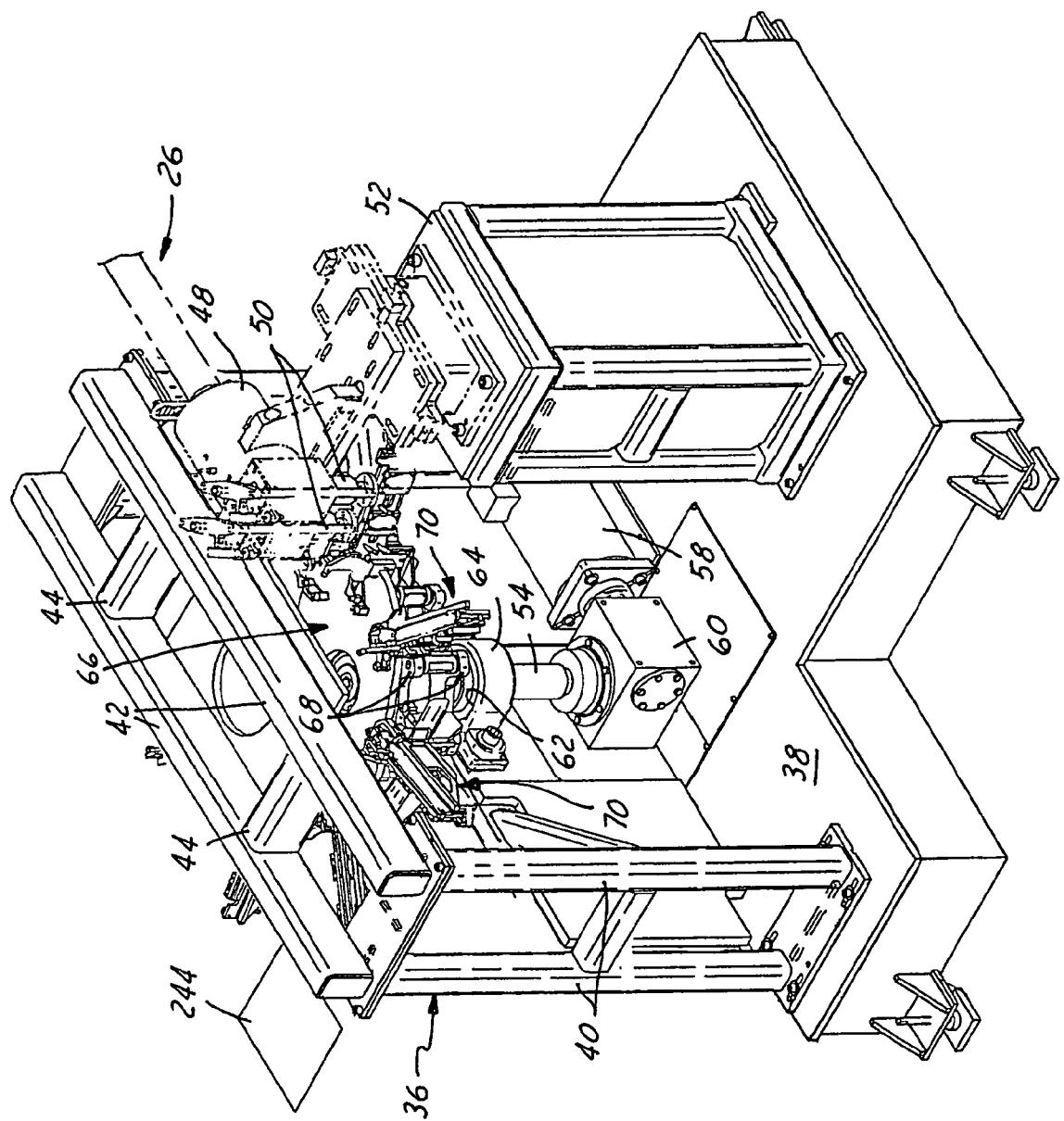
FIG. 2 is a perspective view of the pellet cutter and transfer apparatus of FIG. 1.
Figure 3:
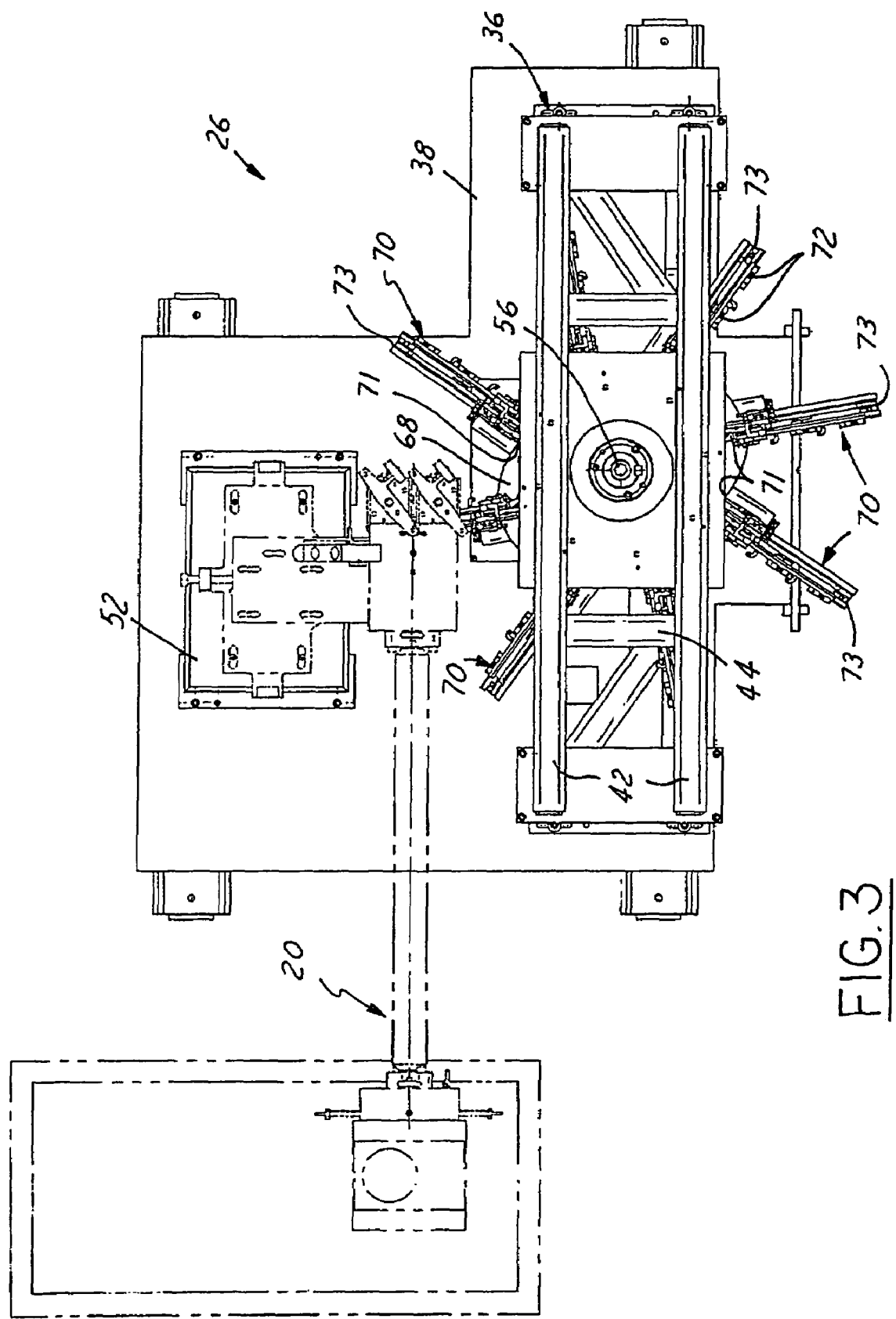
FIG. 3 is a plan view illustrating an extruder and the pellet cutter and transfer apparatus.
Figure 4:
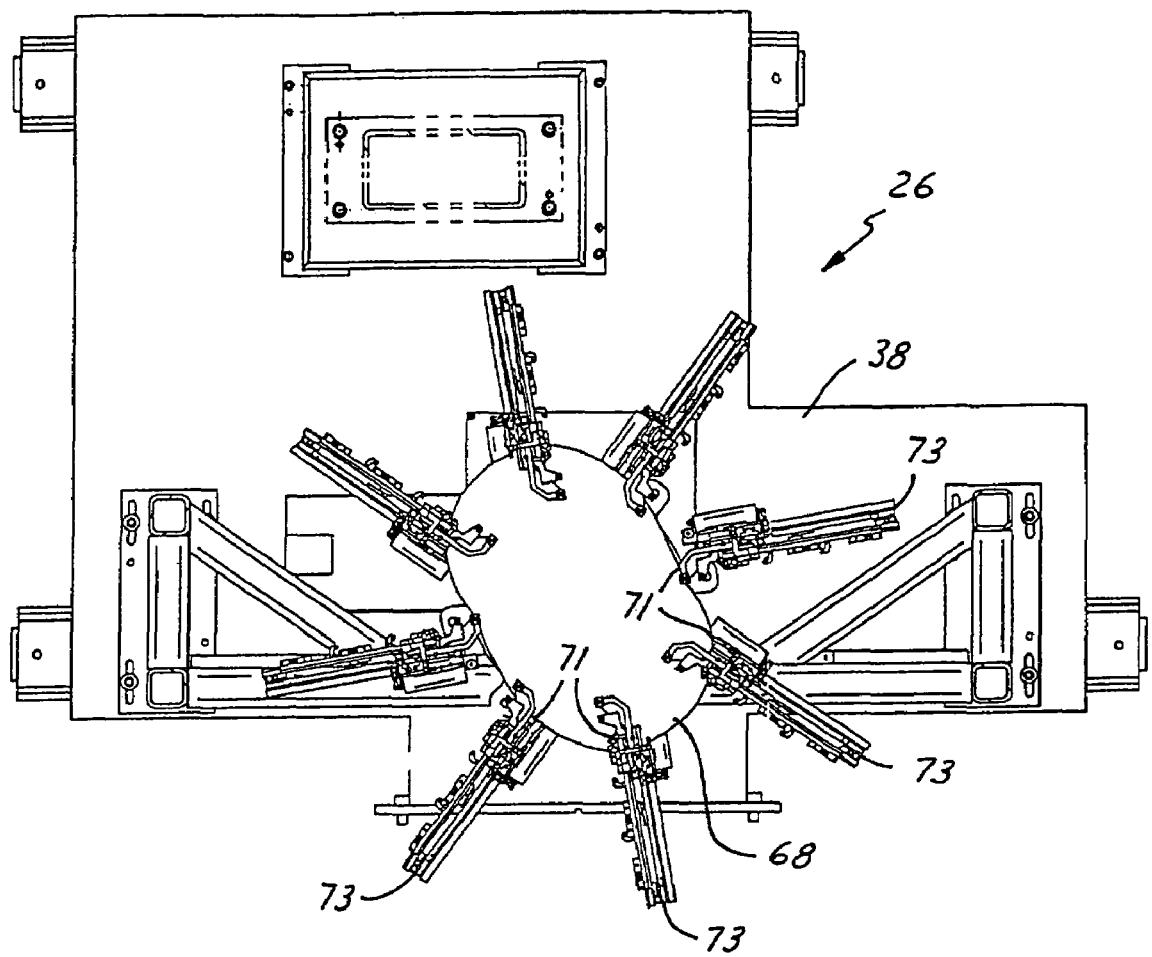
FIG. 4 is a plan view of the pellet cutter and transfer apparatus with a portion of a frame of the apparatus removed.

As best shown in FIGS. 2–4, the pellet cutter and transfer apparatus 26 preferably includes a main frame 36 having a base 38, a plurality of posts 40 extending from the base 38 and interconnected by appropriate beams 42 and cross supports 44 providing a ridged structure. Desirably, an end 48 of the extruder 20 including a pair of outlets 50 of the extruder 20 is carried on a sub frame 52 mounted on the base 38 for communication with the pellet cutter and transfer apparatus 26. Desirably, the mold tooling 18 of the compression molding apparatus 14 includes mold cavities 24 in radially aligned pairs, and the extruder outlets 50 provide two streams of extruded material 20 that are metered and delivered by the pellet cutter and transfer apparatus 26.

The pellet cutter and transfer apparatus 26 includes a main shaft 54 driven for rotation about its longitudinal axis 56 by a motor 58 through an appropriate gear box 60 mounted on the base 38. The shaft 54 is preferably journalled for rotation by bearings 62 disposed in a collar 64 that may be fixed to the frame 36. A hub 66 is operably connected to the shaft 54 for co-rotation with the shaft 54 relative to the frame 36 and the extruder outlets 50. The hub 66 preferably includes a pair of axially spaced plates 68. At least one and preferably a plurality of arms 70 extend generally radially outwardly from the hub 66, are connected at one end 146 to the hub 66 for rotation with the hub 66, and are generally free at their other end 144. The arms 70 preferably include two sets of tooling 72 with each set of tooling 72 being aligned with one of the outlets 50 of the extruder 20 to cut pellets 28 from the associated stream of extruded material 20 and carry and deliver the pellets 28 to the compression molding machine 14.

A cam system 74 (FIGS. 24–27) is carried by the frame 36 and operably associated with the arms 70 such that the arms 70 are displaced relative to the hub 66 as the hub 66 and the arms 70 are rotated relative to the cam system 74. Desirably, each arm 70 includes at least one and preferably a plurality of followers that are responsive to the contour of one or more cam surfaces on the cam system 74 to provide a desired radial, axial and angular-motion of each arm 70 relative to the extruder outlets 50, as well as to the mold cavities 24 of the compression molding machine 14. Preferably, during at least a portion of the rotation of the hub 66, each set of tooling 72 on an arm 70 is axially aligned with a cavity 24 of a mold tooling pair 18. Preferably, as will be set forth in more detail below, the arms 70 are driven so that the path of travel of the sets of tooling 72 matches or is closely aligned with the path of travel of the mold cavities 24 along a desired angular extent of the rotation of the compression molding turret to facilitate delivery of the plastic charges into the mold cavities 24.

As best shown in FIGS. 6–9, each pellet cutter arm 70 includes a base plate 78 extending laterally with an angled or generally transverse support 80 terminating in a cylindrical and tubular wall 82. A pivot shaft 84 is journalled for rotation in the cylindrical wall 82, such as by needle bearings 76, preferably with opposed ends of the shaft 84 extending axially from the cylindrical wall 82. In this manner, the pivot shaft 84 can be coupled to or carried by the upper and lower plates 68 of the hub 66 to define a pivot axis 86 about which the arm 70 pivots. The pivot axis 86 is preferably parallel to the rotational axis 56 of the main shaft 54, which is likewise parallel to the rotational axis 88 (FIGS. 1 and 35) of the turret 16 of the compression molding machine 14. In this manner, the arm 70 is mounted to the hub 66 by a trunnion-like arrangement permitting relatively free pivotal or angular movement of the arm 70 relative to the hub 66. As best shown in FIG. 9, the base plate 78 preferably includes a pair of laterally extending and parallel rails 92 on which are mounted suitable slide blocks 94 providing linear bearings carried by the base plate 78. The linear bearings are preferably arranged generally perpendicular to the pivot axis 86 of the base plate 78. A laterally extending flange 96 preferably includes a first cam follower 98 rotatably carried on a shaft 99 fixed to the flange 96. The first cam follower 98 is responsive to the contour of a corresponding cam surface or cam track of the cam system 74 to pivot the base plate 78 about the pivot axis 86 as desired.

As best shown in FIGS. 5–8 and 10–12, an intermediate plate 100 is preferably mounted to the base plate 78 by the blocks 94 such that the intermediate plate 100 is slidably carried by the base plate 78. A plurality of fasteners may be disposed through a plurality of bores 106 in the intermediate plate 100 to connect the intermediate plate 100 to the blocks 94 of the base plate 78. Desirably, the intermediate plate 100 slides laterally relative to the base plate 78 in a direction that is generally perpendicular to the pivot axis 86. The intermediate plate 100 includes an outwardly extending bracket 108 with a second cam follower 110 rotatably mounted on a shaft 109 carried by the bracket 108. The second cam follower 110 is responsive to the contour of a corresponding cam surface of the cam system 74 to slidably move the intermediate plate 100 relative to the base plate 78 as desired. The intermediate plate 100 also includes at least one and preferably a pair of rails 111 with each rail 111 including at least one block 112 slidably mounted on the rail 111 defining a linear bearing. Preferably, each rail 111 extends parallel to the pivot axis 86 and generally perpendicular to the rails 92 on the base plate 78. The intermediate plate 100 may include outwardly extending flanges 113 with through holes 114 adapted to receive support shafts 115 about which springs 116 may be mounted.

A generally U-shaped cam plate 118 having a contoured cam surface 119 is preferably carried by the intermediate plate 100. The cam plate 118 is preferably adjustably carried by the intermediate plate 100 by retaining blocks 120 fixed to the intermediate plate 100 and including opposed inwardly facing flanges 121 that overly adjacent portions of the cam plate 118 to retain the cam plate 118. An adjustable mounting block 102, such as a jack block 122, is preferably carried in a slot 123 of the intermediate plate 100 to permit lateral adjustment of the cam plate 118 relative to the intermediate plate 100 via a jack screw 124.

As best shown in FIGS. 5–8 and 13–16, each arm 70 preferably includes a third plate 125 that is carried by the intermediate plate 100. The third plate 125 is preferably fixed to the blocks 112 of the linear bearings on the intermediate plate 100 so that the third plate 125 can be slidably displaced relative to the intermediate plate 100 along the rails 111. Accordingly, the intermediate plate 100 is slidably moveable in a direction parallel to the pivot axis 86. The third plate 125 includes an upstanding bracket 126 on which a third cam follower 127 is rotatably mounted by a shaft 128 carried by the bracket 126. The third cam follower 127 is responsive to the contour of a corresponding cam surface or cam track of the cam system 74 to slidably displace the third plate 125 relative to the intermediate plate 100 and base plate 78, as desired.

A lateral slide 129 is preferably slidably carried by the third plate 125 through appropriate bearings or blocks 130 (FIG. 13) carried by the third plate 125. The slide 129 preferably extends generally perpendicular to the pivot axis 86 and hence perpendicular to the movement of the third plate 125 relative to the intermediate plate 100. The slide 129 preferably includes a fourth cam follower 131 rotatably carried by a shaft fixed to a flange 132 of the slide 129. The fourth cam follower 131 is responsive to the contour of a corresponding cam surface or cam track of the cam system 74 to drive the slide 129 relative to the third plate 125 in a direction generally perpendicular to the pivot axis 86. A block 133 carried by the slide 129 may be received in a slot 134 formed in the third plate 125 and engageable with the end of the slot 134 to limit the movement of the slide 129 relative to the third plate 125. As will be discussed in more detail hereafter, one section of each set of tooling 72 is preferably fixed to the third plate 125 and another section of each set of tooling 72 is preferably carried by the slide 129 for movement with the slide 129 relative to the other section to open and close the sets of tooling 72.

As best shown in FIGS. 15 and 16, a fifth cam follower 135 is preferably rotatably carried by a shaft fixed to the third plate 125 for rotation about an axis 136 generally perpendicular to the pivot axis 86. The fifth cam follower 135 is disposed adjacent to and is responsive to the cam surface 119 of the cam plate 118 carried by the intermediate plate 100. One or more coolant passages may be formed in the third plate 125, or by conduits 138 extending from, through or about the third plate 125 to facilitate routing coolant to and from the arms 70 and tooling 72 of the pellet cutter and transfer apparatus 26.

The third plate 125 preferably includes a pair of outwardly extending flanges 140 with through holes 142 adapted to slidably receive the rods 115 carried by the intermediate plate 100 so that the third plate 125 and flanges 140 are slidably moved relative to the rods 115 and the intermediate plate 100. A spring 116 is preferably disposed around each rod 115 between the flange 96 of the intermediate plate 100 and the flange 140 of the third plate 125 to yieldably bias the third plate 125 relative to the intermediate plate 100. A stop block 144 is preferably carried by the third plate 125, such as by being fixed to the support bracket 126 for the third follower 127 or to the third plate 125.

Figure 5:
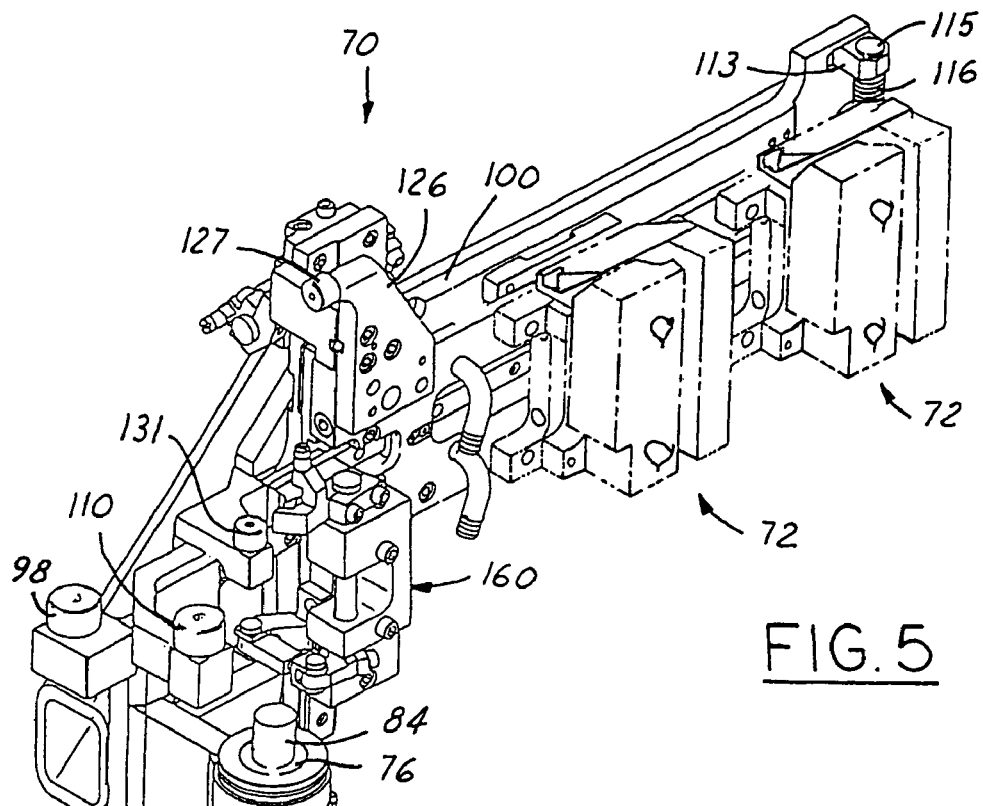
FIG. 5 is a perspective view of one arm and associated tooling of the pellet cutter and transfer apparatus.
Figure 6:
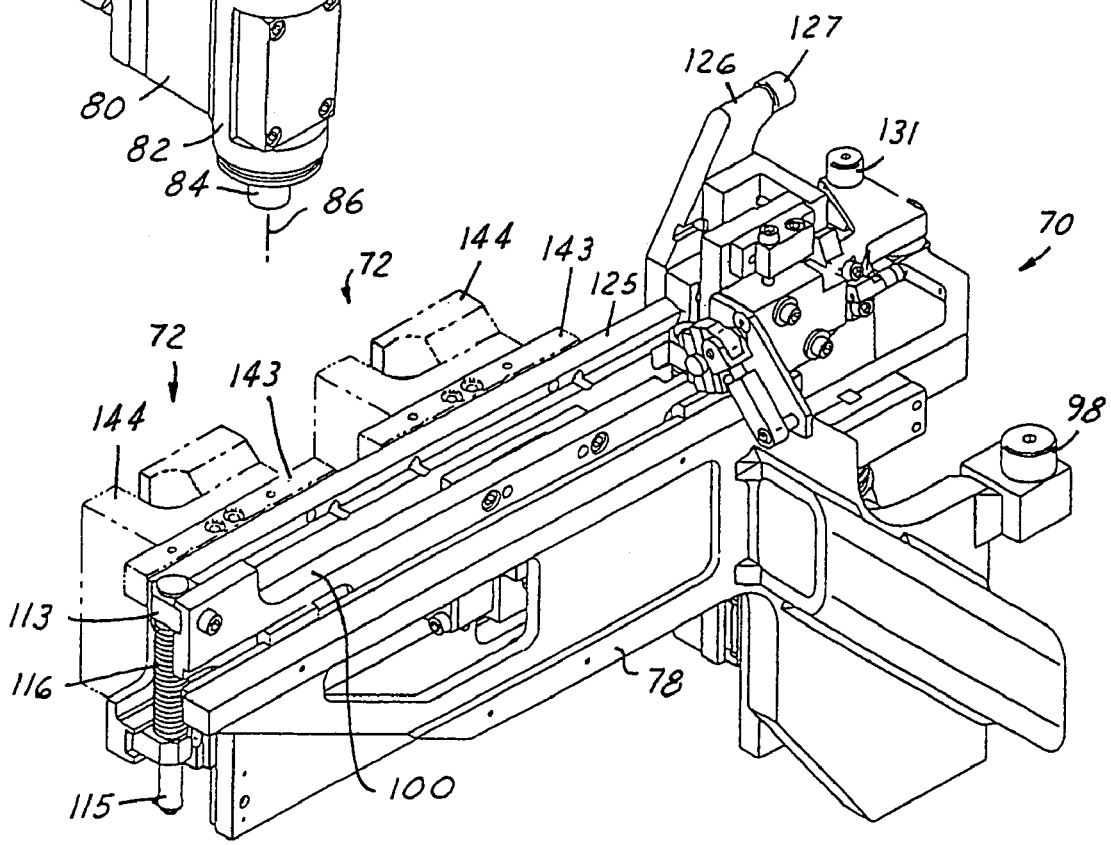
FIG. 6 is a rear perspective view of the arm shown in FIG. 5.
Figure 7:
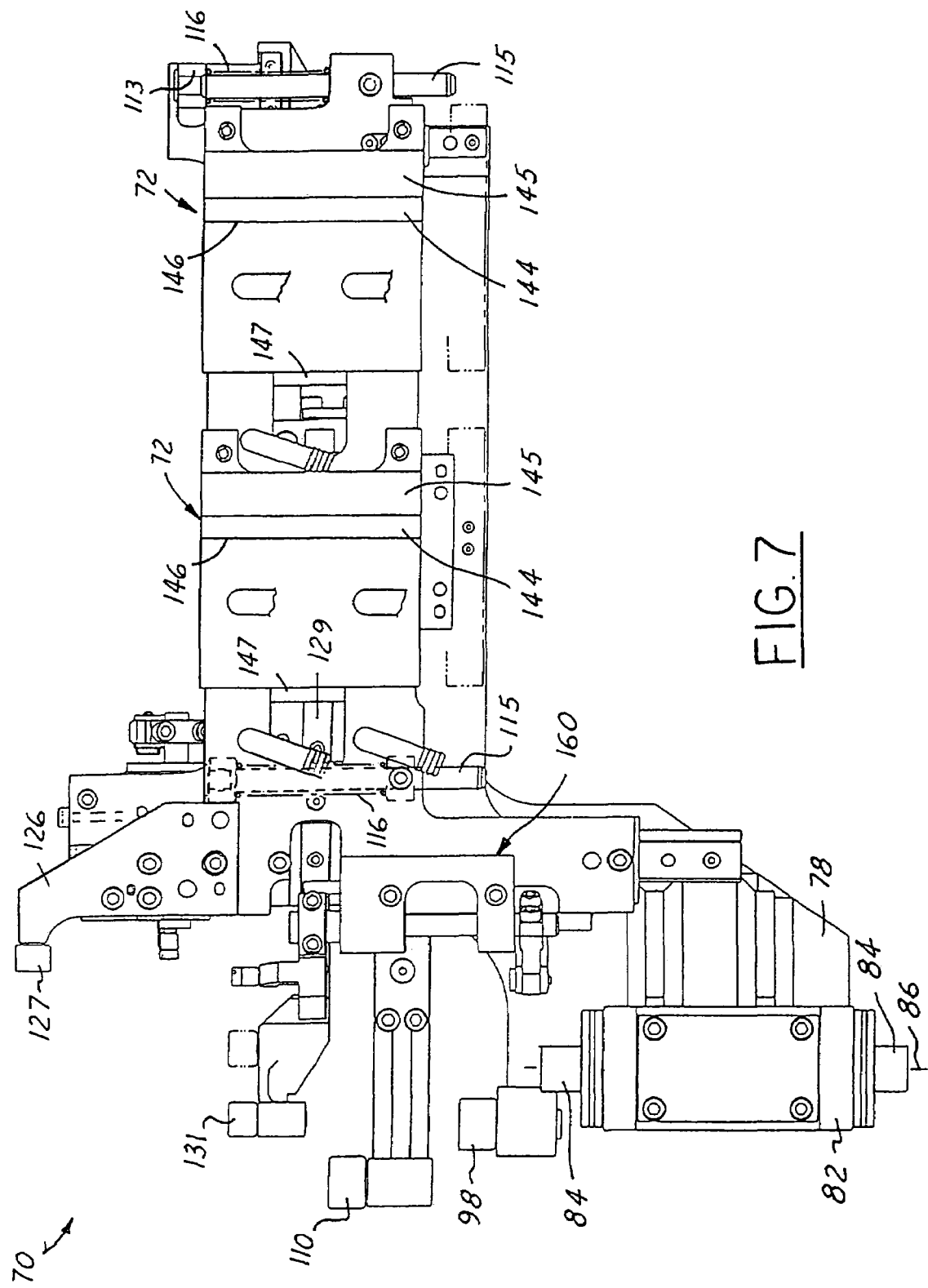
FIG. 7 is a side view of the arm.
Figure 8:
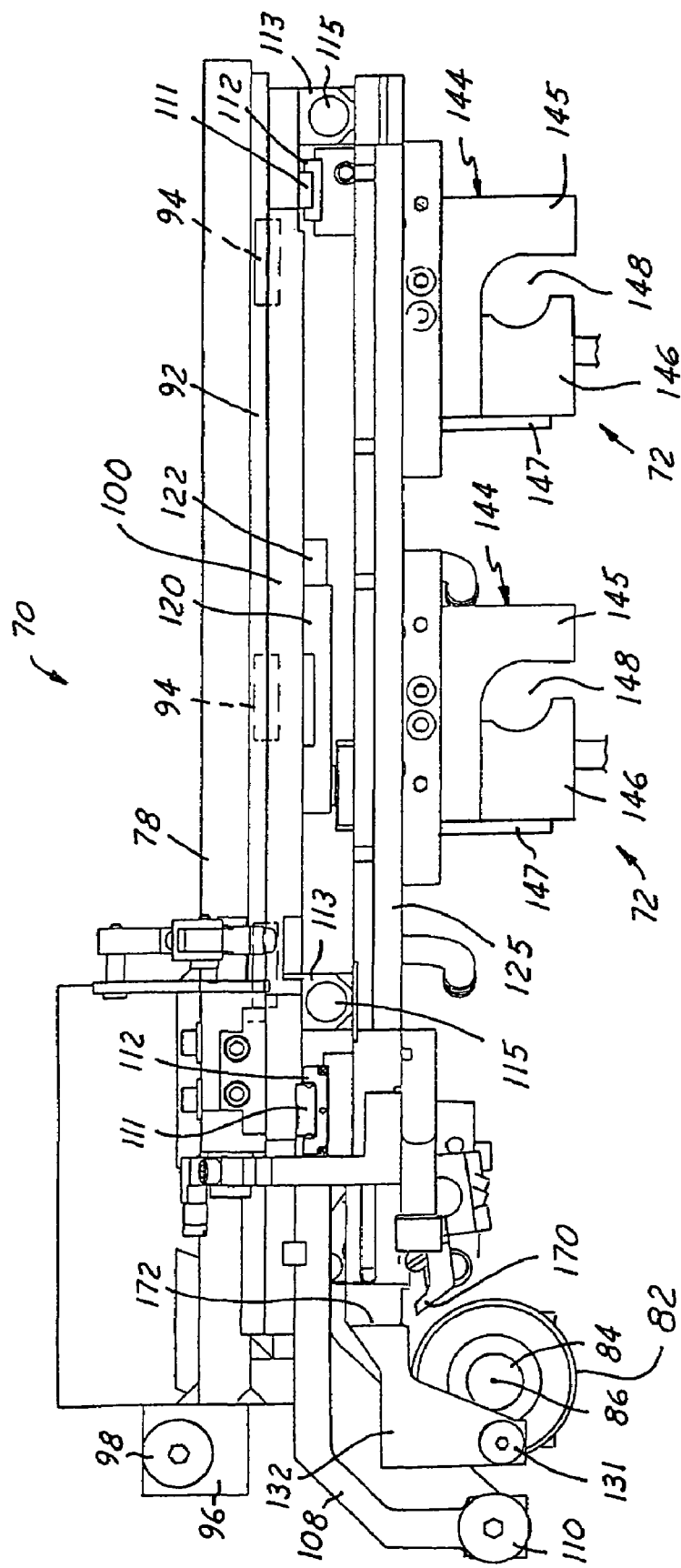
FIG. 8 is a plan view of the arm.
Figure 13:
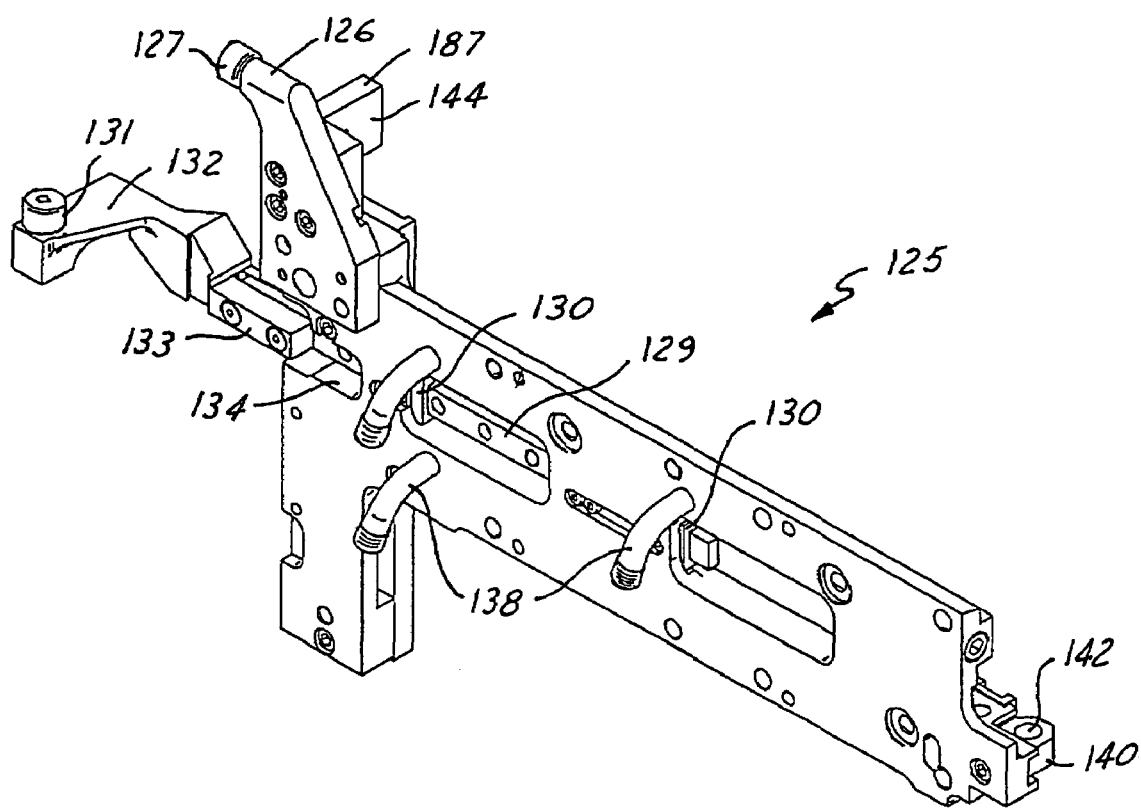
FIG. 13 is a perspective view of a third plate of the arm.
Figure 19:
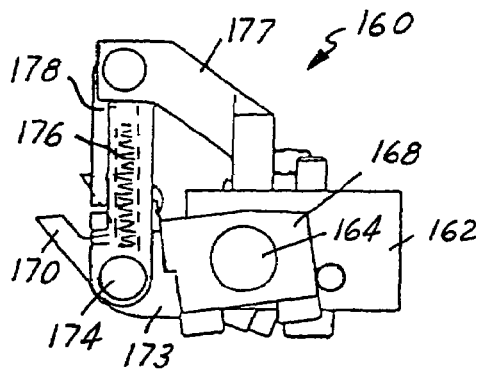
FIG. 19 is a bottom view of the gripper latch.
Figure 17:
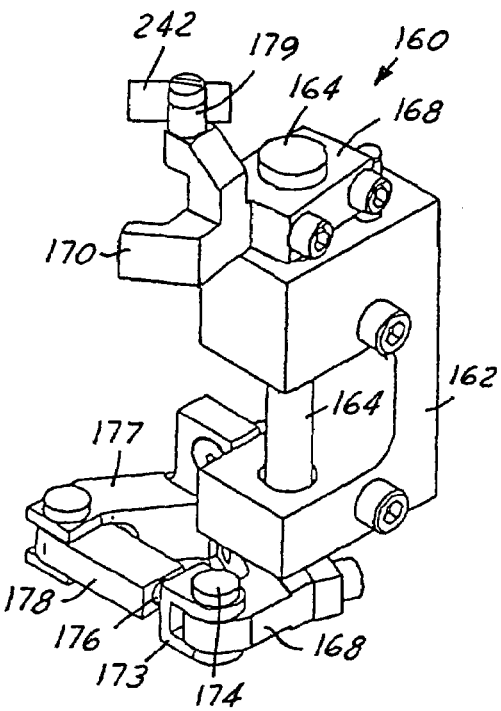
FIG. 17 is a perspective view of a gripper latch of the arm.
Figure 18:
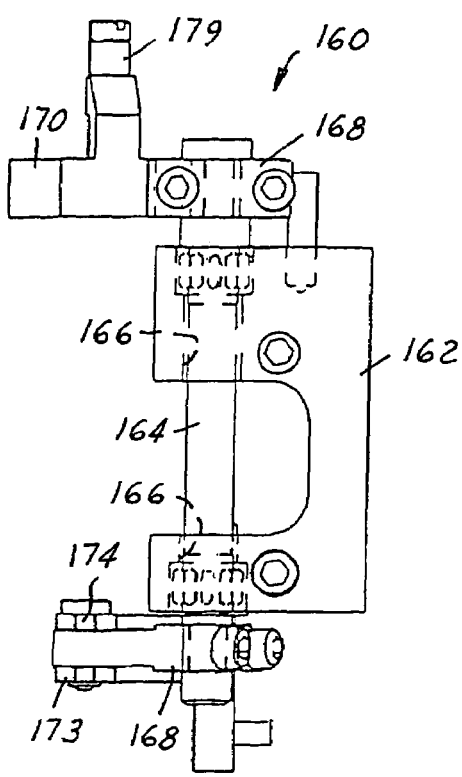
FIG. 18 is a side view of the gripper latch.
Figure 20:
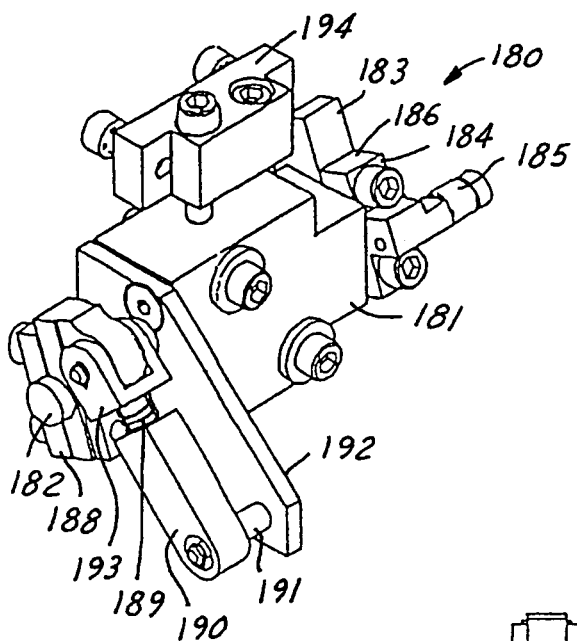
FIG. 20 is a perspective view of one embodiment of a lift latch.
Figure 21:
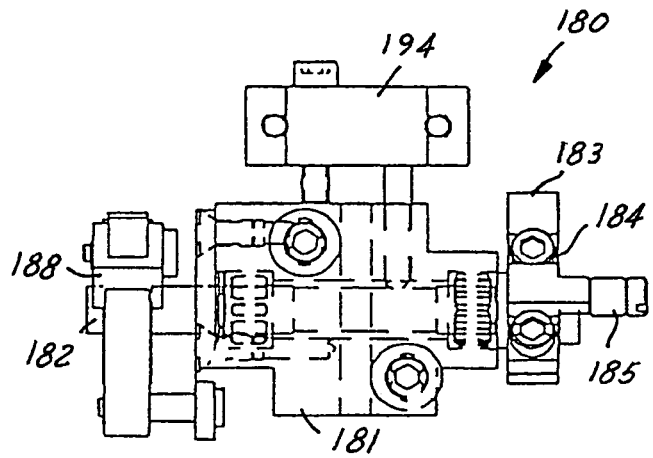
FIG. 21 is a side view of the lift latch.
Figure 22:
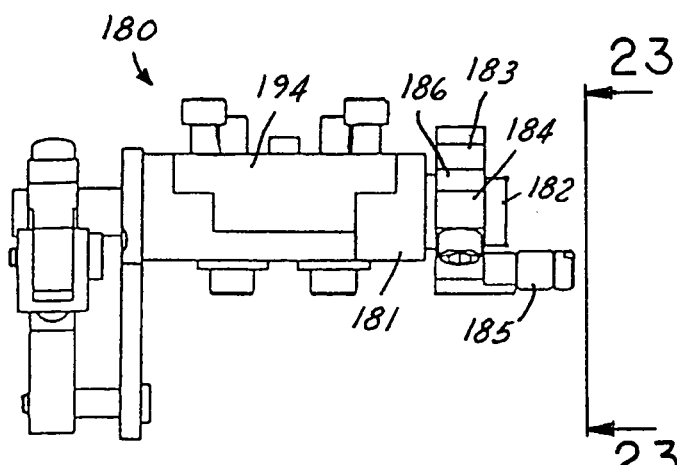
FIG. 22 is a plan view of the lift latch.
Figure 23:
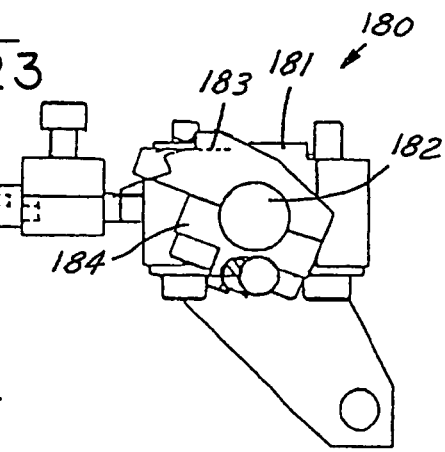
FIG. 23 is a view of the lift latch taken in the direction of the arrows 23—23 in FIG. 22.
Figure 25:
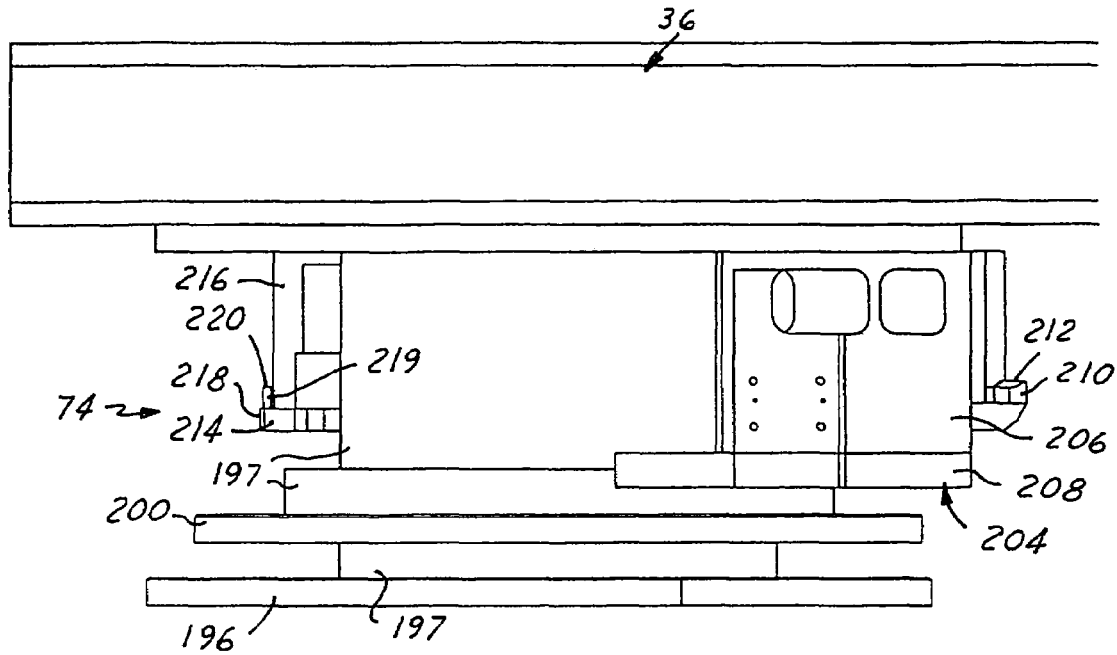
FIG. 25 is a side view of the cam plate assembly.
Figure 24:
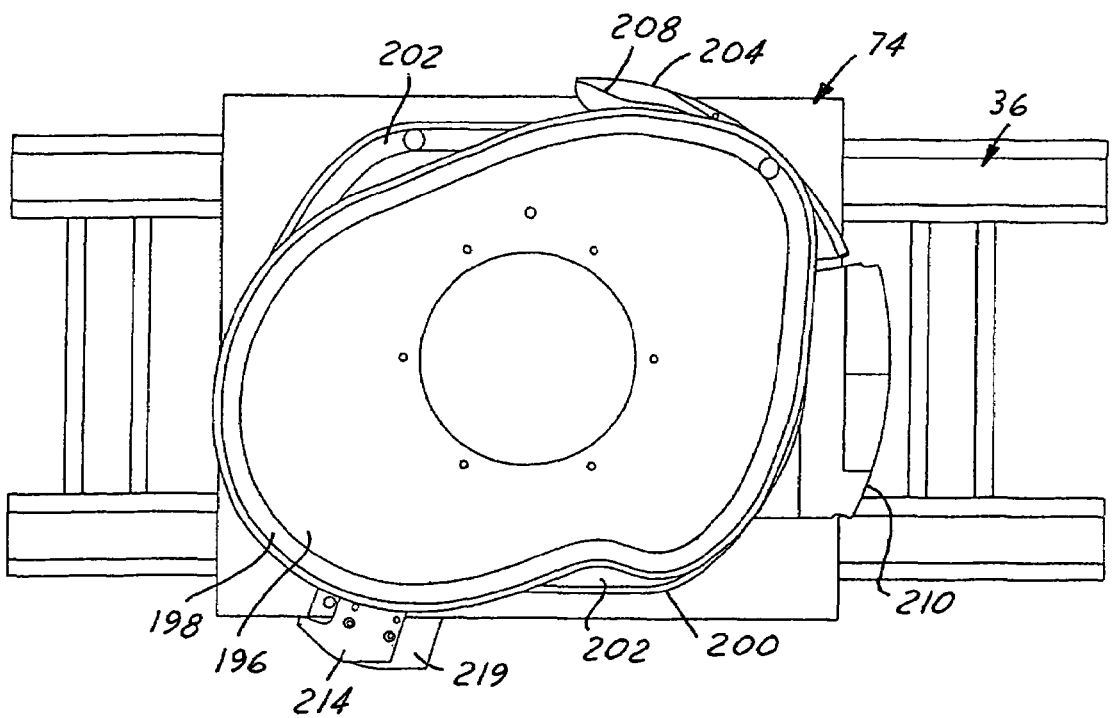
FIG. 24 is a bottom view of a cam plate assembly of the pellet cutter and transfer apparatus.
Figure 26:
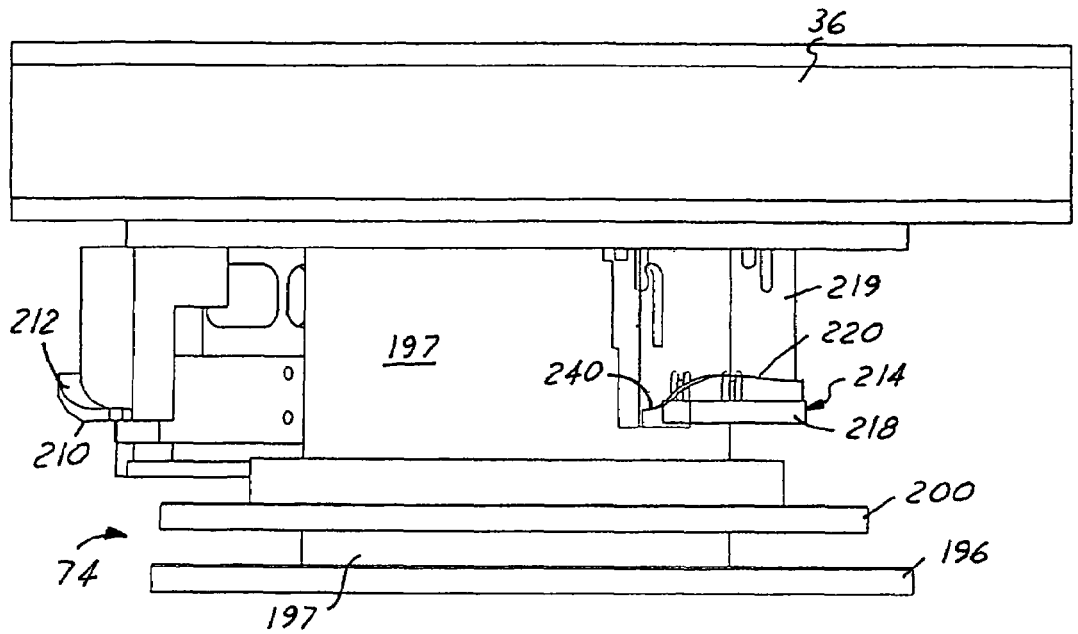
FIG. 26 is another side view illustrating a different portion of the cam plate assembly.
Figure 27:
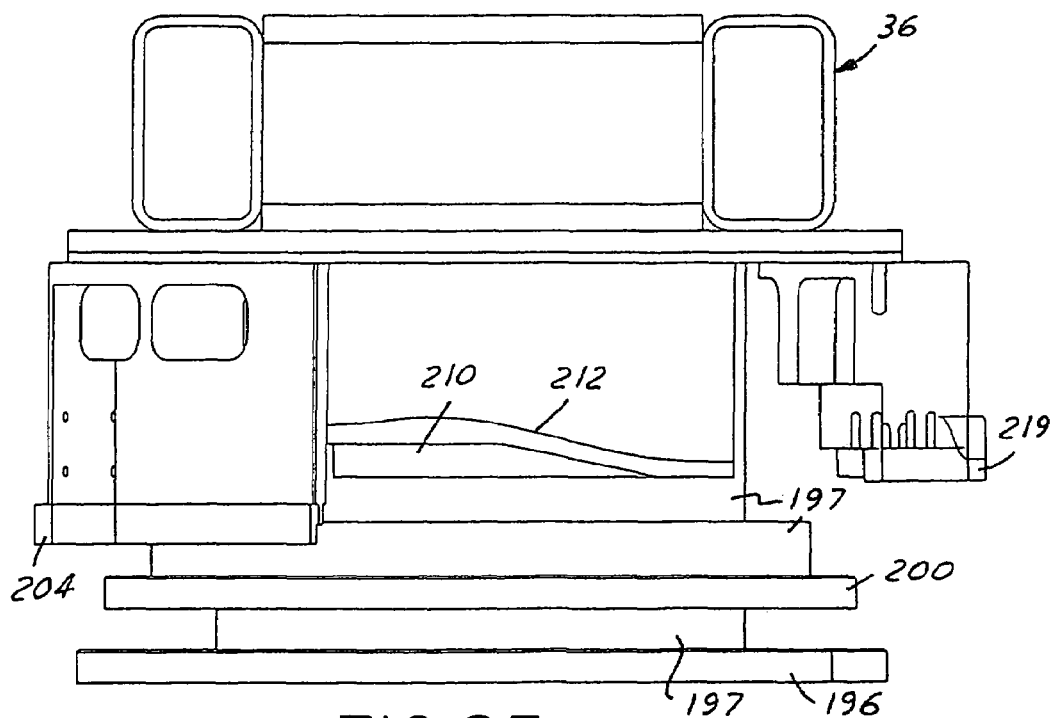
FIG. 27 is a side view illustrating yet another portion of the cam plate assembly.
Figure 28:
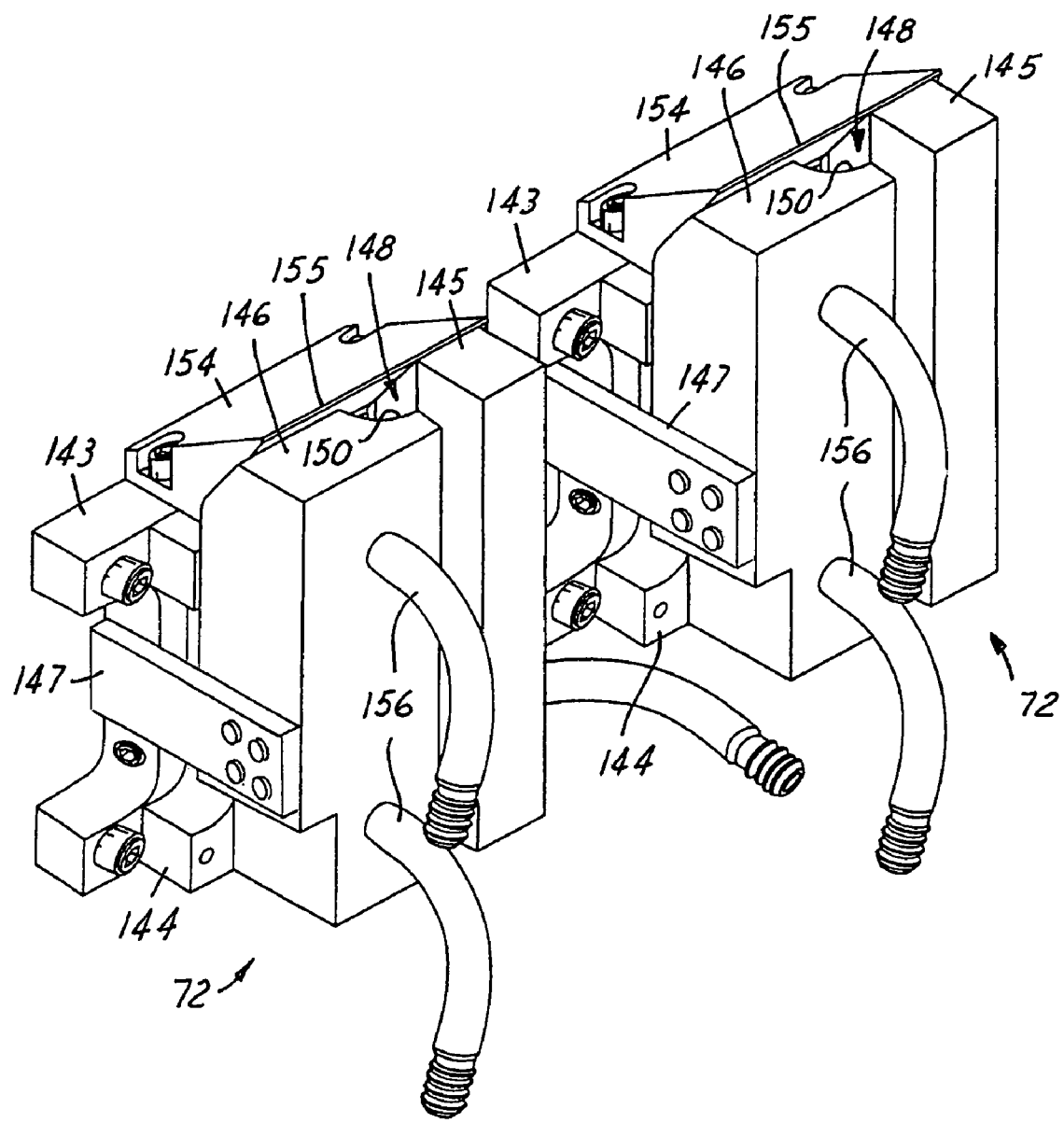
FIG. 28 is a perspective view of the tooling on an arm of the pellet cutter and transfer apparatus.
Figure 29:
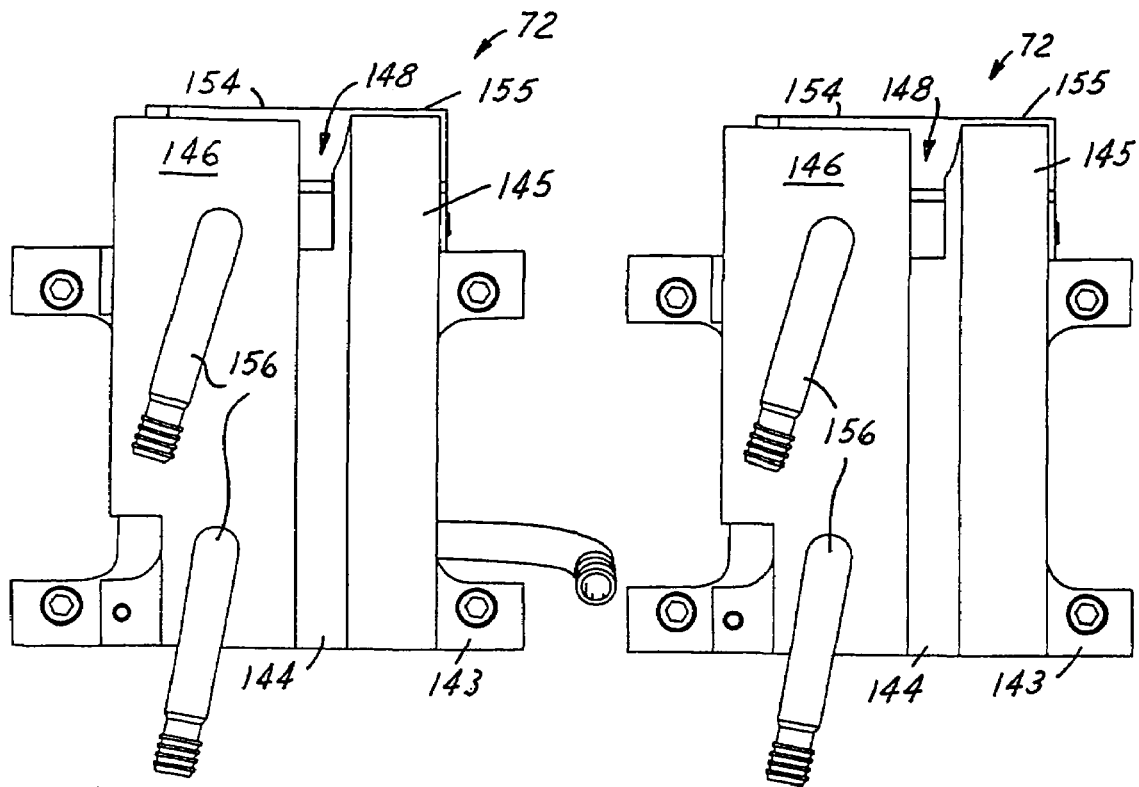
FIG. 29 is a side view of a two sets of tooling carried by the arm of the pellet cutter and transfer apparatus.
Figure 30:
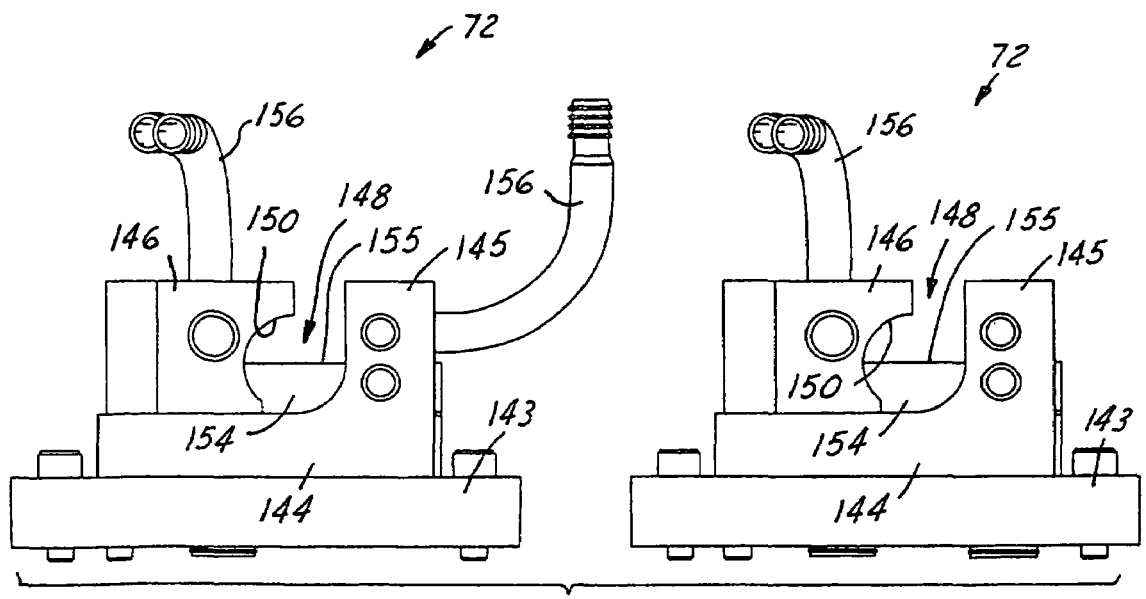
FIG. 30 is a plan view of the tooling.

As best shown in FIGS. 5–8 and 28–30, two sets of tooling 72 are preferably provided on each arm 70. The tooling sets 72 are preferably laterally spaced apart a distance equal to the spacing between the outlets 50 of the extruder 20 such that each tooling set 72 is aligned with a separate one of the outlets 50 of the extruder 20. Each tooling set 72 includes a mounting plate 143 fixed to the third plate 125, a stationary gripper 144 carried by the mounting plate 68 and including an upstanding finger 145, and a moveable gripper 146 with a cavity 148 provided between the moveable gripper 146 and the stationary gripper 144. As best shown in FIGS. 5, 7 and 8, each moveable gripper 146 is carried by a separate bracket 147 that is fixed to the lateral slide 129 for movement relative to the finger 145 to vary the size of the cavity 148 to facilitate receiving, carrying and releasing plastic pellets. Preferably, the movable gripper 146 includes a radiused or arcuate inner surface 150 that defines part of the cavity 148 between the moveable gripper 146 and stationary gripper 144 in which the plastic charge or pellet is received. The radiused inner surface 150 may facilitate receiving a plastic pellet in the cavity 148, and improve the handling of the pellet after it is received in the cavity 148. Also, the shape of the cavity 148 defined by the grippers 144, 146 can be constructed and arranged as desired to provide a desired contact or gripping of a pellet received therein, and may provide at least some shaping or forming of the pellet if desired.

Each tooling set 72 preferably also includes a knife 154 (not shown in FIGS. 6–8) carried by the mounting plate 143 and having a thin and preferably sharp leading edge 155 adapted to cut or shear a stream of extruded material from the extruder 20 as the arm 70 is rotated past the outlets 50 of the extruder 20. Fluid conduits 156 lead to passages that are preferably formed in the moveable and stationary grippers 144, 146 and in the knives 154 to circulate coolant through the grippers 144, 146 and knives 154 in use. The tooling components are preferably formed of a material having high thermal conductivity to facilitate cooling them, and may be also formed from a nonstick or relatively low friction material to avoid or reduce adhesion or undue friction between the plastic pellets and the tooling 72. In one presently preferred embodiment, the knives 154 are formed from Ampco 940 to facilitate heat transfer away from the knives 154, and the grippers 144, 146 are formed from aluminum. The grippers 144, 146 may be coated to prevent or inhibit corrosion. In one presently preferred implementation, the surfaces that contact the plastic pellets are preferably not coated, but may be vapor honed or otherwise treated for improved handling and release of the pellets.

As best shown in FIGS. 5, 7 and 17–19, a gripper latch 160 is carried by the arm 70 and associated with the tooling 72 to control at least in part the movement of the moveable gripper 146 relative to the stationary gripper 144. The gripper latch 160 includes a generally C-shaped bracket 162 that is fixed to the third plate 125 and journals for rotation a shaft 164 extending through aligned bores 166 in the bracket 162. The shaft 164 is maintained on the bracket 162 by a pair of clamps 168 fixed to opposed ends of the shaft 164. One of the clamps 168 preferably includes an outwardly extending latch finger 170 adapted to engage a latch surface which may be a shoulder 172 (FIG. 8) formed in the lateral slide 129 carried by the third plate 125. When the latch finger 170 is engaged with the latch surface 172, the horizontal slide 129 is prevented from moving to prevent movement of the moveable grippers 146 of the tooling 72. In one presently preferred embodiment, the other clamp 168 includes a bracket 173 that receives a pivot shaft 174 via a trunnion mount. The trunnion mount is acted upon by a spring 176 that is operably associated with a flange 177 (such as be a clevis arrangement) that is fixed to the C-shaped bracket 162 to yieldably bias the latch finger 170 away from the latch surface 172 so that the gripper latch 160 is normally open, or unlatched. To close the latch 160 by moving the latch finger 170 into engagement with the latch surface 172, a sixth cam follower 179 is preferably associated with the latch finger 170 and is responsive to the contour of a corresponding cam surface of the cam system 74 to rotate the latch finger 170 about the axis of the shaft 164 when it is desired to close the latch 160. The spring 176 may be enclosed in a retainer 178 that maintains the position and orientation of the spring 176.

A lift latch assembly 180 is preferably carried by the arm 70 to selectively prevent vertical movement of the third plate 125 relative to the intermediate plate 100. It holds the third plate 125 up against the bias of the springs 116 tending to drive the third plate 125 down so that when the latch 180 is released the third plate 125 drops under the force of gravity and the force of the springs 116.

The lift latch 180 includes a main body 181 preferably fixed to the intermediate plate 100 with a shaft 182 extending through the body 181 so that opposed ends of the shaft 182 extend outwardly from the body 181. A latch finger 183 is disposed on one end of the shaft 182 by an appropriate clamp 184 that may be integrally formed with the finger 183. A seventh follower 185 is coupled to the finger 183 to drive the finger 183 between its latched and unlatched positions. The latch finger 183 preferably includes a shoulder 186 adapted to engage a latch surface on the third plate 125, such as a stop surface 187 (FIGS. 13 and 16) on the block 144, to prevent downward movement of the third plate 125 when the latch finger 183 is engaged with the latch surface 187.

At the other end of the shaft 182, a second clamp 188 is preferably fixed to the shaft 182 and is yieldably biased by a spring 189. The spring 189 may be received in a spring retainer 190 carried by a shaft 182 that is fixed to a bracket 192 that is in turn carried by the body 181. One end of the spring 189 is operably coupled to a clevis 193 carried by the second clamp 188 to yieldably bias the latch finger 183 into engagement with the latch surface 187. In this manner, the lift latch 180 can be considered to be normally closed or latched and is moved to an open position or unlatched position by engagement of the seventh follower 185 with a corresponding cam surface. To facilitate adjustment of the vertical position of the third plate 125, and hence of the tooling 72 carried by the third plate 125, a jack block 194 may be provided to permit adjustment of the lift latch 180 relative to the intermediate plate 100 to thereby adjust the position in which the latch finger 183 engages the latch surface 187 on the third plate 125.

As best shown in FIG. 24-27, the cam system 74 in one presently preferred embodiment includes a plurality of cam plates each including at least one cam surface or cam track. For ease of viewing the hub 66 and arms 70, the cam plates have been removed from FIGS. 2–4. A first or lower cam plate 196 is carried by a support plate and block 197 and preferably includes a cam track 198 in which the first follower 98 carried by the base plate 78 is received to control the pivotal or angular movement of the arm 70 about the pivot axis 86. This cam track or surface 198 is preferably circumferentially continuous so that the first follower 98 is generally continuously engaged with the cam track 198 to control the pivoted or angular movement and orientation of the arm 70.

A second cam plate 200 preferably includes a cam surface 202 or track adapted to receive the second cam follower 110 carried by the intermediate plate 100 of the arm 70 to drive the intermediate plate 100 for lateral movement relative to the base plate 78. The cam track 202 is preferably circumferentially continuous so that the second cam follower 110 is received in the cam track 202 throughout the rotation of the hub 66 to maintain control of the horizontal position of the intermediate plate 100 and the third plate 125 that is carried by the intermediate plate 100. Since the arms 70 extend generally radially from the hub 66 (with pivoted or angular movement relative to the hub 66), the contour of the cam surface 202 drives the second cam follower 110 and the intermediate plate 100 generally radially relative to the axis of the shaft 54 and hub 66.

A third cam plate 204 is preferably carried by a bracket 206 fixed to the frame 36 or support 197 and includes a cam surface 208 adapted to engage the fourth follower 131 associated with the lateral slide 129. Hence, changes in the contour of this cam surface 208 drives the movable grippers 146 relative to the stationary grippers 144 to thereby open the tooling 72 for receipt of a plastic mold charge pellet therein.

A fourth cam plate 210 is preferably carried by the frame 36 and includes a cam surface 212 adapted to engage the third follower 127 carried by the third plate 125 during a portion of each revolution of the hub 66 to raise the third plate 125 relative to the base plate 78 and axially or vertically position the tooling 72 relative to the outlets 50 of the extruder 20. Raising the third plate 125 preferably engages the latch surface 187 with the latch finger 183 of the lift latch 180 to hold the third plate 125 in its raised position. Accordingly, with the third plate 125 maintained in its raised position by the latch 180 the arcuate extent or circumferential length of the cam surface 212 of the fourth cam plate 210 can be limited since engagement of the third follower 127 with the cam surface 212 is not needed to maintain the vertical position of the third plate 125.

A fifth cam plate 214 is preferably carried by a bracket 216 fixed to the frame 36 or support 197. The fifth cam plate.214 has a cam surface 218 adapted to engage the seventh follower 185 that is associated with the lift latch finger 183 to release the lift latch 180, or displace the latch finger 183 from the latch surface 187, when desired. Preferably, in the same general area of the hub 66 and the cam system 74, a sixth cam plate 219 preferably integral with or carried by the same bracket 216 that carries the fifth cam plate 214, is provided and has a cam surface 220 adapted to engage the third follower 127 carried by the third plate 125 so that when the lift latch 180 is released, the third plate 125 is supported by engagement of the third follower 127 with the cam surface 220. The cam surface 220 of the sixth cam plate 219 preferably is contoured to permit vertical displacement of the third plate 125 relative to the base plate 78, and this movement may be in a downward direction to facilitate releasing a pellet or charge of plastic from the tooling 72.

In one rotation of the hub 66, each pellet cutter arm 70 cuts the stream of extruded material from each of the pair of extruder outlets 50 forming two pellets or plastic charges carried by arm 70 for delivery to the compression molding machine 14. In more detail, before an arm is swept past the extruder outlets 50, the arm and associated components are in the following state: the sets of tooling 72 are moved to their open position by engagement of the fourth follower 131 (carried by the lateral slide 129) with the cam surface 208 on the third cam plate 204 driving the movable grippers 146 away from their associated stationary grippers 144; the third plate 125 is raised upwardly relative to the base plate 78 by engagement of the third follower 127 with the cam surface 212 on the fourth cam plate 210 so that the lift latch 180 is engaged with the third plate 125 to hold it in its raised position; the cavity 148 of each gripper pair 144,146 is radially aligned with the extruder outlets 50 as controlled by engagement of the second cam follower 110 with the cam surface 202 of the second cam plate 200 which moves the intermediate plate 100 relative to the base plate 78; and the arm 70 is pivoted about the pivot axis 86 by engagement of the first follower 98 with the cam surface 198 of the first cam plate 196 so that the free end 73 of the arm 70 is inclined forwardly relative to a line 222 (FIG. 34) extending radially from the rotational axis 56 to the fixed end 71 of the arm 70. To get into this angular position, the free end 73 of the arm 70 is accelerated relative to the speed of rotation of the hub 66 as the arm 70 is pivoted.

Figure 34:
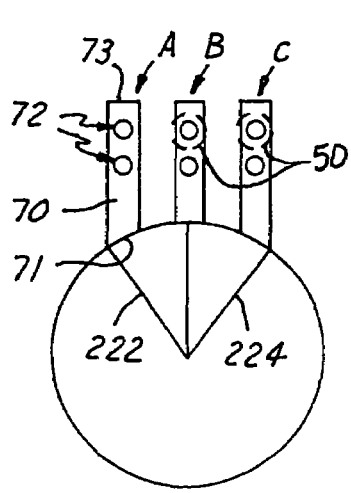
FIG. 34 is a diagrammatic view illustrating the movement of an arm of the pellet cutter and transfer apparatus relative to an axis about which the arm is driven.

As best shown in FIG. 34, as the arm 70 approaches the area of the extruder outlets 50, the free end 73 of the arm 70 is decelerated relative to the hub 66 by pivoting the arm 70 about the pivot axis 86, and the intermediate plate 100 is moved radially relative to the base plate 78 (as controlled by engagement of the second follower 110 with the cam surface 202 of the second cam plate 200) so that the arm 70 travels in a straight line as the arm 70 is swept through the area of the extruder outlets 50. FIG. 34 diagrammatically illustrates three positions of an arm 70 as it is moved through the area of the extruder outlets 50. In position A the free end 73 of the arm 70 leads the pivoted end 71 of the arm 70 relative to the radial line 222. In position B the free end 73 and pivoted end 71 of the arm 70 are radially aligned. And in position C the free end 73 of the arm trails the pivoted end 71 of the arm 70 relative to a radial line 224 extending from the axis 56 to the pivoted end 71 of the arm 70. This facilitates accurately cutting the extruded material streams with the knives 154 and capturing the cut plastic pellets in the tooling 72.

After the plastic pellets are cut from the extruded material streams, the sets of tooling 72 are closed by a suitable biasing member, such as a spring, acting on the tooling 72 to relatively quickly and preferably gently close the sets of tooling 72 on the plastic pellets. If desired, the sets of tooling 72 can compress, stretch or otherwise form the plastic pellets into a desired shape for subsequent delivery and molding in a mold cavity 24.

With the plastic pellets captured in the sets of tooling 72, subsequent rotation of the hub 66 positions the arm 70 to deliver the plastic charges into the mold cavities 24. To facilitate aligning the gripper cavities 148 with the associated mold cavities 24, the arm 70 and cam system 74 are constructed so that a midpoint 230 between the sets of tooling 72 on each arm 70 travels along a plane 232 during the portion of the hub 66 rotation wherein the mold charge pellets 28 carried by the sets of tooling 72 are generally aligned with the mold cavities 24. To do this, the arm 70 is pivoted by engagement of the first follower 98 with the cam surface 198 of the first cam plate 196 so that the free end 73 of the arm 70 leads or is advanced forward relative to a line 234 extending radially from the rotational axis 56 to the pivoted end.71 of the arm 70. The arm 70 is preferably inclined relative to this radial line 234 by between about 10 and 50 degrees, more preferably between about 20 to 40 degrees, and most preferably about 25 to 35 degrees. The intermediate plate 100 is also driven relative to the base plate 78 to radially align the sets of tooling 72 with the mold cavities 24.

Figure 35:
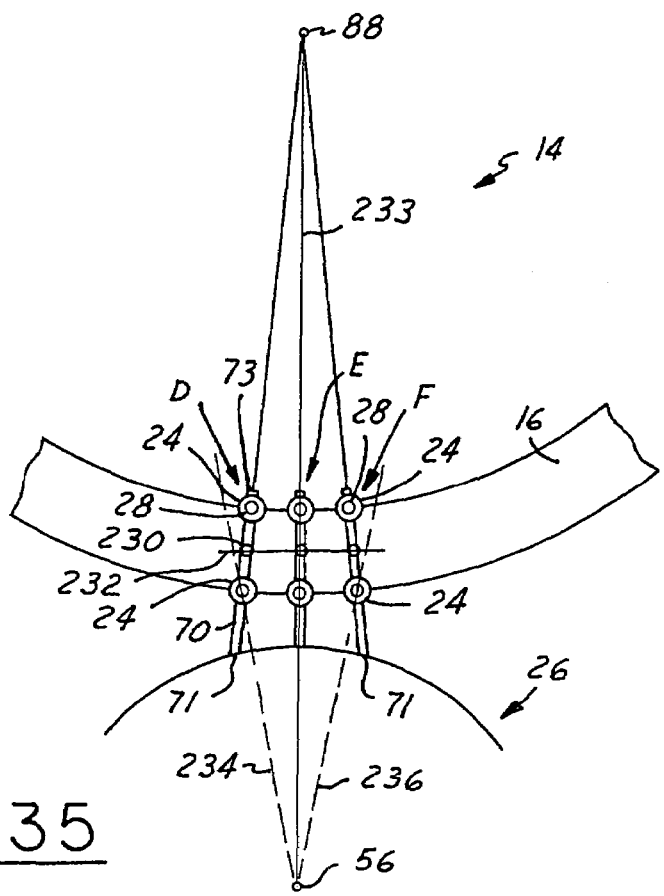
FIG. 35 is a diagrammatic view illustrating the movement of an arm of the pellet cutter and transfer apparatus relative to the axis about which the arm is driven and relative to the path of travel of mold cavities of a molding machine.

As best shown in FIG. 35, when the arm 70 is swept through the area of the mold cavities 24, the free end 73 of the arm 70 is decelerated relative to the hub 66 by pivoting the arm 70 about the pivot axis 86, and the intermediate plate 100 is driven radially or laterally so that the midpoint 230 between the tooling sets 72 is moved generally along the plane 232. Since in one presently preferred embodiment the mold cavities 24 are radially aligned relative to the rotational axis 88 of the compression molding turret 16 and are moving along an arcuate path defined by the turret 16, the arm 70 is desirably pivoted at a rate that is a function of the angular rotational speed of the compression molding turret 16. This enables the cavity 148 of each gripper 72 to be axially aligned with an associated mold cavity 24 over an arc long enough to initially align the pellets 28 carried by the grippers 72 with the corresponding mold cavities 24 and deliver the plastic pellets 28 into the mold cavities 24. Preferably, the midpoint 230 between the cavities 148 of the sets of tooling 72 travels generally along the plane 232 over at least 10 to 70 degrees of hub rotation, and more preferably over 40 to 50 degrees of hub rotation, although other ranges or values may be employed for a particular application. In this range of hub rotation, the arm 70 is preferably generally radially aligned with the rotational axis 88 of the compression molding machine turret 16.

The plane 232 is preferably generally perpendicular to a plane 233 including the rotational axis 88 of the turret 16 and the axis 56 of the hub 66, although the plane 232 can be inclined relative to the plane 233 by an acute included angle of up to about 10 degrees. In the presently preferred embodiment, the pellets are preferably delivered into the corresponding mold cavities during a window of hub 66 rotation that begins about 25 degrees before the plane 233 and continues until about 25 degrees after the plane 233, over about 50 degrees of hub rotation as noted above.

The arm 70 moves from a first position, labeled 'D' in FIG. 35 wherein the free end 73 leads the pivoted end 71, through a position labeled 'E' in FIG. 35 wherein the free end 73 of the arm 70 is radially aligned with the pivoted end 71 and to a position 'F' wherein the free end 73 of the arm 70 trails the pivoted end 71 of the arm 70 relative to a radial line 236 extending to the pivoted end 71 of the arm 70. At the end of this portion of the hub rotation, the free end 73 of the arm 70 may trail the pivoted end 71 relative to a radius 236 of the hub 66 extending to the pivoted end 71 of the arm 70 by between about 15 to 45 degrees, and more preferably by between 25 to 30 degrees, although other orientations and movement of the arms 70 may be employed. In one presently preferred embodiment, the gripper cavities 148 are sufficiently aligned with the mold cavities 24 to deliver plastic charges into the mold cavities 24 over at least some and preferably a substantial portion of this range of hub rotation.

When the sets of tooling 72 are aligned with the associated mold cavities 24, the third follower 127 carried by the third plate 125 is engaged with a cam surface 220 on the sixth cam plate 219 to raise the third plate 125 relative to the intermediate plate 100 and disengage the latch surface 187 from the lift latch finger 183. The lift latch follower 185 is then engaged with the cam surface 218 on the fifth cam plate 214 to open or release the lift latch 180 so the latch finger 183 is disengaged from the third plate 125. The springs 116 bias the third plate 125 downwardly maintaining the third follower 127 engaged with the cam surface 220 on the sixth cam plate 219 which has a sharply axially declining section permitting rapid lowering of the third plate 125 relative to the base plate 78 under the force of gravity and the springs 116. The downward movement of the third plate 125 moves the fifth follower 135 relative to the cam plate 118 which is contoured to move the lateral slide 129 in a direction driving the movable grippers 146 away from their associated stationary grippers 144 to open the sets of tooling 72 at a desired rate and time and facilitate releasing the plastic pellets 28 from the sets of tooling 72 as the third plate 125 is dropping or moving axially downwardly. The cam surface 220 of the sixth cam plate 219 preferably includes a laterally extending finish section 240 (FIG. 26) that stops or slows the downward travel of the third plate 125 so that the downward inertia of the plastic pellets 28 ensures that they are released from the sets of tooling 72. In this manner, the plastic pellets 28 are transferred from the sets of tooling 72 to the mold cavities 24. The downward or axial travel of the tooling 72 preferably occurs over a range of between 5 and 25 degrees of hub rotation, although other arrangements may be employed. After the pellets have been transferred to the mold cavities 24, the arm 70 is positioned as described above for movement past the extruder outlets 50 to cut and gather the next pair of mold charge pellets 28 to be delivered by that arm 70.

In one presently preferred embodiment, the pellet cutter and transfer apparatus 26 includes eight arms 70 (FIG. 4) generally evenly circumferentially spaced about the hub 66. Accordingly, for each rotation of the hub 66, sixteen mold charge pellets 28 are delivered. Also in one presently preferred embodiment, the compression molding machine 14 with which the pellet cutter and transfer apparatus 26 is used, has forty (40) mold tooling pairs 18 with each mold tooling pair 18 including four (4) mold cavities 24. Thus, each rotation of the hub 66 supplies the plastic charges for four (4) of the mold tooling pairs 18 of the compression molding machine 14, and to fill every mold cavity 24, the hub 66 must be rotated ten (10) times for each rotation of the turret 16 of the compression molding machine 14. Accordingly, the hub 66 is preferably rotated at a speed that is a function of the speed of rotation of the turret 16 of the compression molding machine 14. Preferably, the motor 58 that rotates the hub 66 is servo-controlled and communicated with a controller that either controls or is informed of the speed of rotation of the compression molding turret 16 so that the pellet cutter and transfer apparatus 26 is synchronized with the compression molding turret 16.

Upon initial start-up of the pellet cutter and transfer apparatus 26, it may be necessary or desirable to reject or discard a certain number of plastic pellets. This may be necessary or desirable to ensure that the extruded material streams are flowing at a desired rate so that the plastic pellets are of the proper size and volume. To facilitate rejecting plastic pellets, the gripper latch 160, which is normally unlatched or open, may be engaged or closed by a movable cam plate 242 (FIG. 17) that is aligned with the sixth follower 179 carried by the gripper latch finger 170 only when plastic pellets are to be rejected. The gripper latch 160 holds the sets of tooling 72 open (with the movable grippers 146 moved away from the stationary grippers 144) so that the tooling 72 does not closely engage or hold the plastic pellets. To ensure that the pellets are removed from the tooling 72, a reject mechanism 244 (FIG. 2) can be provided downstream of the extruder outlets 50 and axially aligned with the cavities of the sets of tooling 72. The reject mechanism 244 may have, for example, one or more jet or nozzles adapted to provide a stream or burst of a pressurized fluid (such as air or water) that drives the pellets 28 to be rejected out of the sets of tooling 72 as they are moved past the nozzles. When it is desired to cease rejecting plastic pellets, the reject mechanism 244 is turned off and the movable cam plate 242 is moved so that it no longer engages the sixth follower 179 of the first latch 160, which returns to its open or unlatched position 202 under the force of the spring 176 so that the sets of tooling 72 can be closed on the pellets 28 as described above.

Figure 31:
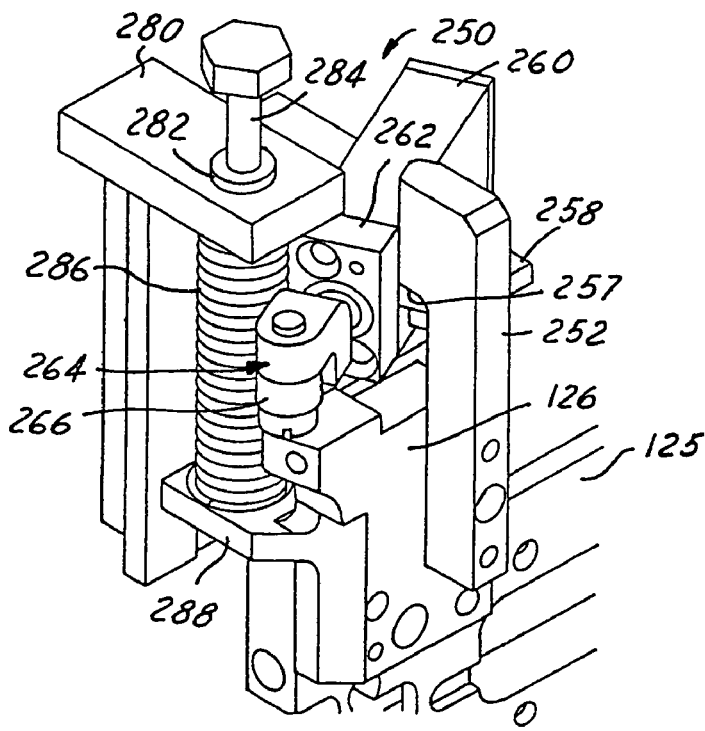
FIG. 31 is a perspective view of an alternate embodiment of a lift latch.
Figure 32:
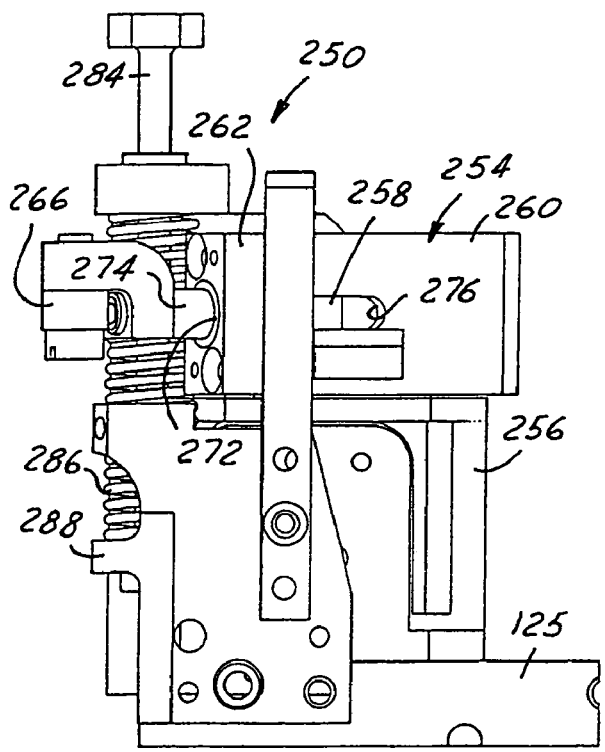
FIG. 32 is a side view of the lift latch of FIG. 31.
Figure 33:
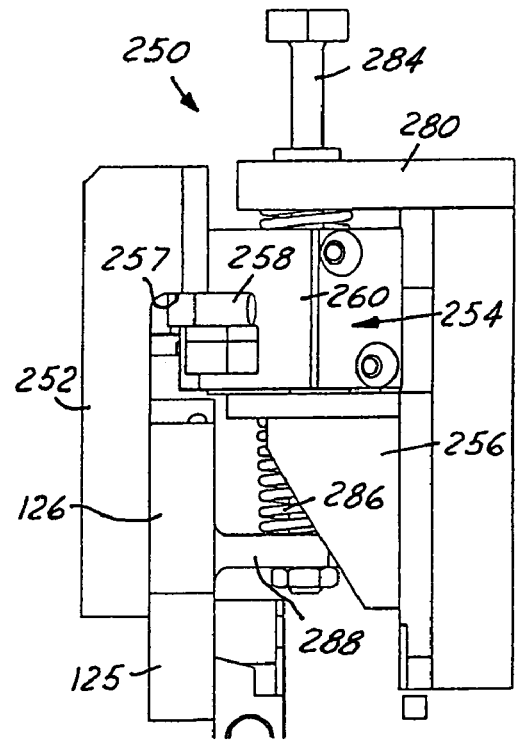
FIG. 33 is an end view of the lift latch.

A second embodiment of a lift latch 250 is shown in FIGS. 31–33. This lift latch 250 includes a latch finger 252 carried by the bracket 126 on the third plate 125 that carries the third follower 127, and a slidable catch assembly 254 carried on a bracket 256 fixed to the intermediate plate 100 of the arm 70. The latch finger 252 includes a shoulder 257 adapted to be selectively engaged with a catch plate 258 of the catch assembly 254 to releasably hold the third plate 125 in a raised position as described with reference to the first embodiment lift latch 180.

The catch assembly 254 includes a slide block 260, a support block 262, a slide 264, a cam follower 266 and the catch plate 258. The slide block 262 is carried by the bracket 256 so that a bore (not shown) in the slide block 262 is aligned with a bore 272 in the support block 262. The slide 264 preferably includes a generally cylindrical shaft portion 274 slidably received in the bores of the blocks 260, 262 preferably with bearings disposed between them. One end of the slide 264 is coupled to the cam follower 266 so that the slide 264 is driven relative to the slide block 260 in response to changes in the contour of a corresponding cam surface. The catch plate 258 is coupled to the slide 264 for co-movement with the slide 264 relative to the latch finger 252 and is preferably slidably received in a slot 276 formed in the slide block 260. The catch plate 258 and slide 264 move between a latched position wherein the shoulder 257 of the finger 252 overlies at least a portion of the catch plate 258 and an open position wherein the catch plate 258 is spaced from the latch finger 252.

When it is desired to latch the third plate 125 in a raised position to cut and receive in the tooling 72 a pair of plastic pellets, the third plate 125 is raised relative to the intermediate plate 100, and when the shoulder 257 of the latch finger 252 clears (i.e. is raised above) the level of the catch plate 258, the slide 264 may be driven toward the latched position wherein a portion of the catch plate 258 is disposed beneath the shoulder 257 of the latch finger 252. The third plate 125 can be lowered to engage the latch finger 252 with the catch plate 258, and thereafter the third plate 125 may be supported by the latch assembly 250. To unlatch the third plate 125 so that it may be lowered to discharge the plastic pellets 28, the third plate 125 is preferably raised slightly to disengage the latch finger 252 from the catch plate 258. The slide 264 is then moved toward its open position so that the catch plate 258 is not disposed beneath the latch finger 252 and subsequent downward movement of the third plate 125 does not engage the latch finger 252 with the catch plate 258.

In addition to the modified lift latch 250, the arm 70 may be modified as shown in FIGS. 31–33, to include an extended flange 280 on the intermediate plate 100 with an opening 282 that receives a shaft 284 about which a spring 286 is provided. One end of the spring 286 engages the flange 280 and the other end of the spring 286 engages a flange 288 extending from the bracket 126 on the third plate 125. In this manner, the third plate 125 is yieldably biased axially downwardly relative to the intermediate plate 100 of the arm 70. The spring 286 of this embodiment may be used in addition to or may replace one or both of the springs 116 disposed between the intermediate plate 100 and the third plate 125 as set forth above.

Figure 36:
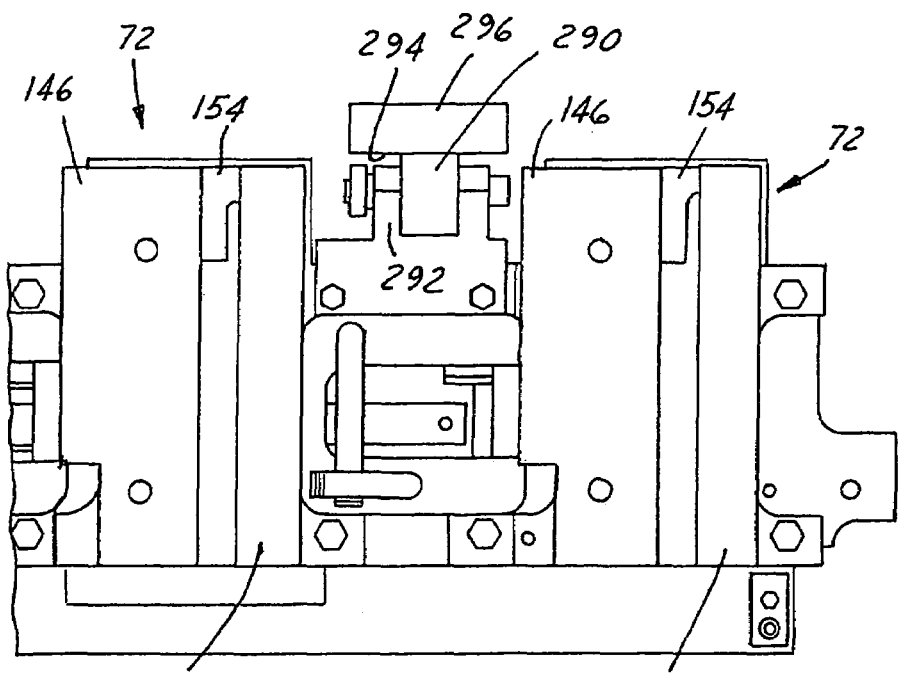
FIG. 36 is a fragmentary side elevational view of illustrating a portion of an arm of the pellet cutter and transfer apparatus according to an alternate embodiment of the invention.

As best shown in FIG. 36, another cam follower 290 may be carried on the arm 70, preferably by the third plate 125. The cam follower 290 preferably rotates about a shaft carried by a bracket 292 fixed to the third plate 125. The shaft preferably extends generally perpendicular to the pivot axis 86 and parallel to the lateral movement of the intermediate plate 100 relative to the base plate 78. The cam follower 290 is adapted to engage a cam surface 294 of a cam plate 296 provided between the extruder heads to provide a consistent axial position reference for the tooling 72, and specifically for the knives 154 relative to the extruder outlets 50. The cam follower 290 also supports the arm 70 against torsional forces tending to twist the arm 70 such as may be caused by deceleration of the free end 73 of the arm 70 as it is swept past the extruder outlets 50.

While certain preferred embodiments and constructions and arrangements of particular components of the compression molding apparatus, the pellet cutter and transfer apparatus and method of delivering mold charge pellets to a mold cavity have been shown and described herein, one of ordinary skill in this art will readily understand that modifications and substitutions can be made without departing from the spirit and scope of the invention as defined by the appended claims. For example, without limitation, while in the presently preferred embodiments two extrudate streams are provided to enable simultaneous delivery of two mold charge pellets, the invention can be practiced to deliver a single mold charge pellet or more than two mold charge pellets. Of course, other modifications and substitutions will be apparent from this disclosure. Further, relative adjectives like "upper," "lower," "central," "downward", and the like are used to describe features of the apparatus and method with respect to the position and orientation of such features as shown in the accompanying drawings of the presently preferred embodiments.

The invention claimed is:

1. A method of delivering a mold charge pellet to a molding machine having a mold cavity, the method including the steps of:
   providing a stream of molten plastic;
   cutting said stream to form a pellet;
   carrying said pellets away from said stream on an arm;
   moving said arm about an axis toward the molding machine and aligning said pellet carried by said arm with said mold cavity by radially and angularly displacing said arm relative to said axis over a portion of the path of travel of the arm; and
   moving at least a portion of said arm axially to discharge said pellet from said arm and into said mold cavity.

2. The method of claim 1 wherein said step of moving said arm toward the molding machine includes moving the arm so that a portion of said arm travels in a plane.

3. The method of claim 2 wherein said molding machine includes an axis about which said mold cavity is rotated, said arm is rotated about a second axis parallel to the axis of the molding machine and said plane is perpendicular to a plane including the axis of the molding machine and the second axis.

4. The method of claim 1 wherein two streams of molten plastic are provided and both streams are cut to form two separate pellets by rotating said arm through said streams.

5. The method of claim 4 wherein said molding machine includes an axis, said arm is rotated about a second axis parallel to the axis of the molding machine and said plane is perpendicular to a plane including the axis of the molding machine and the second axis.

6. The method of claim 5 wherein said portion of said arm includes a point midway between said two pellets.

7. The method of claim 6 wherein during said portion of said path of travel of the arm wherein said point travels along a plane, said arm is initially angularly positioned so that one end of the arm leads the other end of the arm relative to a radial line extending from the second axis to the arm, and during said portion of said path of travel the arm is angularly displaced so that said one end of the arm trails said other end of the arm relative to a radial line extending from the second axis to the arm.

8. The method of claim 1 wherein said arm includes a base plate and a plate carried by and axially movable relative to the base plate, and said step of moving at least a portion of the arm axially includes moving said axially movable plate relative to the base plate.

9. The method of claim 8 which also includes the step of providing a force yieldably biasing said axially movable plate to an axially lowered position, and said step of moving at least a portion of said arm axially is accomplished by moving the axially movable plate under said biasing force and the force of gravity.

10. A method of delivering a mold charge pellet to a molding machine having a mold cavity, the method including the steps of:
    providing a stream of molten plastic;
    cutting said stream to form a pellet;
    carrying said pellet away from said stream on an arm;
    moving said arm about an axis toward the molding machine and aligning said pellet carried by said arm with said mold cavity by radially and angularly displacing said arm relative to said axis over a portion of the path of travel of the arm.

11. The method of claim 10 wherein during said portion of said path of travel of the arm, said arm is initially angularly positioned so that one end of the arm leads the other end of the arm relative to a radial line extending from said axis to the arm, and during said portion of said path of travel the arm is angularly displaced so that said one end of the arm trails said other end of the arm relative to a radial line extending from said axis to the arm.

* * * * *